US012743261B2

(12) United States Patent
Oruganti et al.

(10) Patent No.: US 12,743,261 B2
(45) Date of Patent: Sep. 22, 2026

(54) SYSTEM MANAGER FOR ANTICIPATORY AUTODEPLOYMENT OF SOFTWARE COMPONENTS

(71) Applicant: Oracle International Corporation, Redwood Shores, CA (US)

(72) Inventors: Satish Chandra Oruganti, Bengaluru (IN); Ganesh Kumar Gupta, Bengaluru (IN); Michael Patrick Rodgers, Antelope, OR (US)

(73) Assignee: Oracle International Corporation, Redwood Shores, CA (US)

( * ) Notice: Subject to any disclaimer, the term of this patent is extended or adjusted under 35 U.S.C. 154(b) by 246 days.

(21) Appl. No.: 18/604,795

(22) Filed: Mar. 14, 2024

(65) Prior Publication Data

US 2025/0291567 A1 Sep. 18, 2025

(51) Int. Cl.
*G06F 8/60* (2018.01)
*G06F 8/61* (2018.01)

(52) U.S. Cl.
CPC .................................... *G06F 8/61* (2013.01)

(58) Field of Classification Search
CPC ........................................................ G06F 8/61
See application file for complete search history.

(56) References Cited

U.S. PATENT DOCUMENTS 10,601,683 B1 * 3/2020 Kulshreshtha ...... H04L 41/5019
11,762,537 B1 * 9/2023 Rothschiller ......... G06F 3/0482 715/764
2012/0030658 A1 * 2/2012 Hu ...................... G06F 11/3692 717/124
2021/0240170 A1 * 8/2021 Skubacz .......... G05B 19/41845
2022/0327172 A1 * 10/2022 Davies .................. G06F 16/285

* cited by examiner

*Primary Examiner* — Jae U Jeon
(74) *Attorney, Agent, or Firm* — Invoke

(57) ABSTRACT

A system manager is disclosed for automatically deploying software based on user activity. The system manager receives user-specified parameters to control whether, when, and/or how automatic deployment is performed for software components, without specifying which software components are to be automatically deployed for the user. The system manager stores software component metadata identifying software components that are available for deployment. The system manager analyzes user activity to determine autodeployment utility scores that predict degrees of utility for different software components. Based on determining that an autodeployment utility score for a candidate software component satisfies one or more conditions that are based on the user-specified parameters, the system manager automatically performs deployment operation(s) for the candidate software component in a computing environment of a user.

20 Claims, 6 Drawing Sheets

SYSTEM MANAGER FOR ANTICIPATORY AUTODEPLOYMENT OF SOFTWARE COMPONENTS

BACKGROUND

Users use computing environments to perform various tasks more efficiently. The computing environments are often preconfigured with software, and the user may customize or update the computing environment by adding or removing software components over time. Users may discover that new software is desired when the currently configured software components do not allow current tasks to be performed efficiently. This is a trial-and-error process where users attempt to solve problems using their existing software configuration and seek updates or new software when the existing software configuration does not provide the desired functionality.

Users may search for new software using search engines, app stores, and software provider web sites to find software that provides desired functionality. If other users have searched for software that provides the same functionality, and/or if websites offer software targeting the searched functionality, the user may find software that appears to provide desired functionality.

If a user is fortunate enough to find software that appears to provide the desired functionality and the user is able to find a legitimate download link for the software, the user may download the software by selecting the download link and downloading an archive or other installation file. Depending on the user's network bandwidth and the size of the new software, the download process could take a significant amount of time. The user may then follow the software provider's installation instructions to install the software on her/his computing environment. This process may also be time-consuming and heavily use computing resources in the computing environment.

After the software is installed, the user may begin testing the software for the desired functionality. If the software is not what the user expected, due to misleading marketing form the software provider or misunderstanding of the marketing by the user, the user may then begin a new search for software that provides the desired functionality, still unable to complete the task at hand.

BRIEF SUMMARY

A system manager is disclosed for automatically deploying software based on user activity. The system manager receives user-specified parameters to control whether, when, and/or how automatic deployment is performed for software components, without specifying which software components are to be automatically deployed for the user. The system manager stores software component metadata identifying software components that are available for deployment. The system manager analyzes user activity to determine autodeployment utility scores that predict degrees of utility for different software components. Based on determining that an autodeployment utility score for a candidate software component satisfies one or more conditions that are based on the user-specified parameters, the system manager automatically performs deployment operation(s) for the candidate software component in a computing environment of a user.

In some embodiments, a computer-implemented method includes receiving, for one or more first software users, one or more parameters of one or more first conditions of a software component autodeployment setting. The software component autodeployment setting at least partially controls whether to automatically deploy any candidate software components to one or more computing environments of the one or more first software users. The software component autodeployment setting for the one or more first software users is different than another software component autodeployment setting available for the one or more first software users, and the other software component autodeployment setting comprises one or more other parameters for the one or more first conditions. In other words, the software component autodeployment setting is variable. At least one of the one or more first conditions is not specific to any candidate software component.

The method further includes storing candidate software component deployment metadata identifying a plurality of software components available for deployment in a particular computing environment of a particular software user of the one or more first software users. The plurality of software components available for deployment comprise a particular software component and one or more other software components. The particular computing environment of the particular software user does not include the particular software component and does not include the one or more other software components.

The method further includes receiving one or more particular logs of user activity in the particular computing environment by the particular software user, and analyzing the one or more particular logs of user activity of the particular software user using a machine learning model trained on a plurality of logs of user activity of a plurality of software users. The machine learning model is used to determine a particular autodeployment utility score comprising a predicted degree of utility of the particular software component, if deployed, for the particular software user, and one or more other autodeployment utility scores comprising one or more other predicted degrees of utility of the one or more other software components, if deployed, for the particular software user. Based at least in part on determining that the one or more first conditions of the software component autodeployment setting are satisfied, and based at least in part on the particular autodeployment utility score and the one or more other autodeployment utility scores, the method includes automatically performing one or more deployment operations for the particular software component in the particular computing environment of the particular software user without automatically performing one or more deployment operations for the one or more other software components. The one or more first conditions would not be satisfied based on the one or more other parameters. In other words, variation of the software component autodeployment setting may impact whether the one or more first conditions are satisfied.

In a further embodiment, the method automatically performs one or more deployment operations for the particular software component in the particular computing environment at least in part by downloading the particular software component to the particular computing environment. The automatic performance of the one or more deployment operations further includes, after said downloading is complete, automatically installing the particular software component in the particular computing environment. The automatic installation generates an executable version of the particular software component that references one or more particular resources of the particular computing environment. In this embodiment, prior to the automatic installation, the particular software component was not installed in the particular computing environment, and the particular software component did not reference the one or more particular resources of the particular computing environment.

In another further embodiment, the method includes automatically performing one or more deployment operations for the particular software component in the particular computing environment at least in part by downloading the particular software component to the particular computing environment. The automatic performance of the one or more deployment operations further includes, after said downloading is complete, notifying the particular software user that said downloading is complete. In this embodiment, the particular software component did not exist in the particular computing environment prior said downloading, and installation of the particular software component is not automatically triggered after said downloading.

In another further embodiment, the plurality of logs of user activity of the plurality of software users indicate a pattern that the particular software component is used after a gap of time after one or more other software user activities having one or more characteristics. In this embodiment, analyzing the one or more particular logs of user activity comprises comparing one or more particular characteristics of the user activity of the one or more particular logs with the one or more characteristics and determining that an amount of time has passed relative to the gap of time. The particular autodeployment utility score accounts for a similarity between the one or more particular characteristics and the one or more characteristics, and the amount of time relative to the gap of time.

In another further embodiment, the particular software component is a first particular software component, and the plurality of logs of user activity of the plurality of software users indicate a cluster of software components that are used by same software users. The cluster of software components comprise the first particular software component and a second particular software component. The second particular software component is indicated to be in use by the one or more particular logs of user activity. The particular autodeployment utility score accounts for the second particular software component that is indicated to be in use.

In another further embodiment, analyzing the one or more particular logs of user activity of the particular software user using the machine learning model trained on the plurality of logs of user activity of the plurality of software users to determine the particular autodeployment utility score comprises determining a predicted cost, in terms of one or more computing resources, of performing the one or more deployment operations for the particular software component, determining a predicted benefit of having the one or more deployment operations performed automatically ahead of time rather than manually upon request, and determining a predicted likelihood that the particular software component will be used by the particular software user. In this embodiment, the particular autodeployment utility score is based at least in part on the predicted cost, the predicted benefit, and the predicted likelihood that the particular software component will be used.

In another further embodiment, the one or more parameters of the one or more conditions indicate one or more weights of one or more utility characteristics for the software component autodeployment setting. In this embodiment, analyzing the one or more particular logs of user activity of the particular software user using the machine learning model trained on the plurality of logs of user activity of the plurality of software users to determine the particular autodeployment utility score comprises determining a plurality of values for a plurality of utility characteristics for implementing the particular software component in the particular computing environment for the particular software user. Analyzing the one or more particular logs further includes generating one or more weighted utility values by weighting one or more of the plurality of values corresponding to the one or more utility characteristics according to the one or more weights. In this embodiment, the particular autodeployment utility score is based at least in part on the one or more weighted utility values.

In another further embodiment, after automatically performing the one or more deployment operations for the particular software component, the method includes receiving feedback from the particular software user about the particular software component. The method further includes updating the machine learning model based at least in part on the feedback, and analyzing logs of user activity of software users to determine autodeployment utility scores using the machine learning model as updated.

In another further embodiment, the method further includes determining that automatically performing the one or more deployment operations for the particular software component would use an amount of resources, and determining that the amount of resources for the particular software component is not available in the particular computing environment. The method further includes determining a second particular autodeployment utility score for a second particular software component for which deployment has already been performed in the particular computing environment, and, based at least in part on the second particular autodeployment utility score and based at least in part on determining that the amount of resources for the particular software component are not available in the particular computing environment, automatically removing the second particular software component from the particular computing environment before automatically performing the one or more deployment operations for the particular software component.

In another further embodiment, the machine learning model is a first machine learning model that accounts for at least one different utility characteristic than a second machine learning model. The method further includes analyzing the one or more particular logs of user activity of the particular software user using the second machine learning model trained on a plurality of logs of user activity of a plurality of software users to determine a second particular autodeployment utility score comprising a second predicted degree of utility of the particular software component, if deployed, for the particular software user, and one or more other second autodeployment utility scores comprising one or more other second predicted degrees of utility of the one or more other software components, if deployed, for the particular software user. In this embodiment, the second predicted degree of utility is different than the predicted degree of utility, and the automatic performance of deployment operations is further based at least in part on the second predicted degree of utility.

In various aspects, a system is provided that includes one or more data processors and a non-transitory computer-readable storage medium containing instructions which, when executed on the one or more data processors, cause the one or more data processors to perform part or all of one or more methods disclosed herein.

In various aspects, a computer-program product is provided that is tangibly embodied in a non-transitory machine-readable storage medium and that includes instructions configured to cause one or more data processors to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

In various embodiments, techniques are described for autodeploying software components according to configuration parameters and based on predicted utilities of autodeploying the software components. These techniques may be implemented using non-transitory computer-readable storage media to store instructions which, when executed by one or more processors of a computer system, cause autodeploying software components in one or more target computing environments. The techniques for autodeploying software components may be implemented on a local or cloud-based computer system that includes processor(s) and storage device(s) for autodeploying software components. The computer system may communicate with client computer systems for autodeploying software components on the client computer systems.

A description is provided in the following sections for autodeploying software components according to configuration parameters and based on predicted utilities of autodeploying the software components:

CONFIGURING PARAMETERS FOR AUTODEPLOYMENT OF SOFTWARE COMPONENTS

MAINTAINING SOFTWARE COMPONENT DEPLOYMENT METADATA

MONITORING USER ACTIVITY AND SOFTWARE STATE

DETERMINING AUTODEPLOYMENT UTILITY SCORES.

AUTODEPLOYING SOFTWARE COMPONENTS

The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Configuring Parameters for Autodeployment of Software Components

Figure 1:
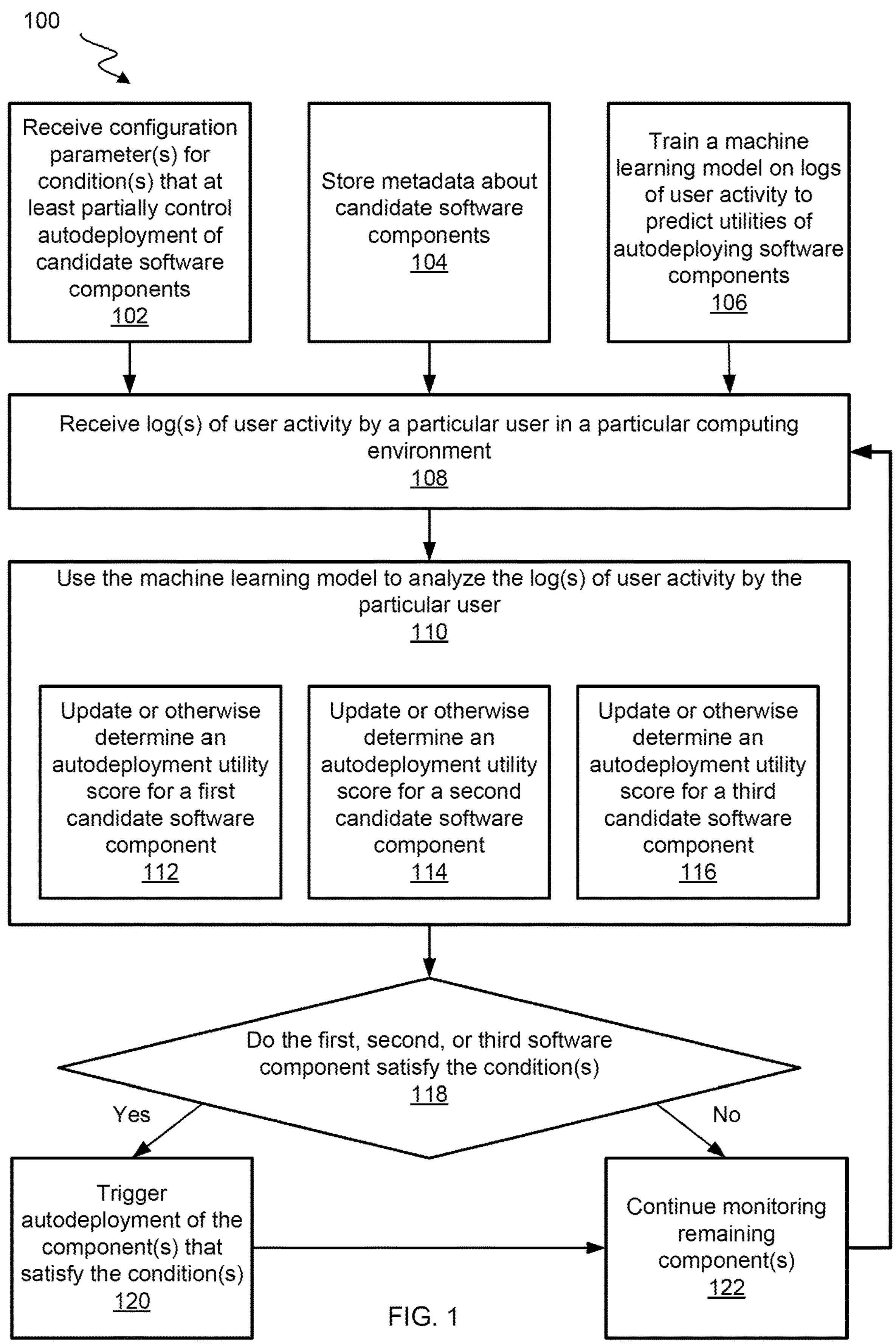
FIG. 1 depicts a flow chart for an example process of autodeploying software components according to configuration parameters and based on predicted utilities of autodeploying the software components.

In one embodiment, the system manager generates an autodeployment configuration interface that provides options for a user to configure parameters for autodeployment of software components. FIG. 1 illustrates a process for autodeploying software components. As shown, in block 102, a system manager receives configuration parameter(s) for condition(s) that at least partially control autodeployment of candidate software components. For example, the user may provide preferences in terms of times or time windows to autodeploy (e.g., evening preferences that differ from work day preferences), privacy of candidate software components (e.g., whether software components can access certain resources, data, or tools on the device and/or publishing capabilities of the software components), security of candidate software components (e.g., whether software components must have been certified by a specific company, municipality, or process), space consumption (e.g., minimum, maximum, rolling average, etc. in terms of overall free space and/or space used for autodeployed software components) of candidate software components, bandwidth consumption for autodeployment (e.g., autodeployment activities allowed during times of peak consumption, which may be different than autodeployment activities allowed during times of low or medium consumption), aggressiveness of autodeployment (e.g., a tolerance degree or prediction threshold for autodeploying software components that are never used), whitelisted software components, blacklisted software components, whitelisted functionality, blacklisted functionality, whitelisted types of software components, blacklisted types of software components, whitelisted software component sources or providers (e.g., trusted providers), blacklisted software component sources or providers, and/or any other parameter that impacts how the system manager determines whether to autodeploy software components and, if so, which ones to autodeploy.

Received configuration parameters such as the example configuration parameters listed above form conditions that control whether software components are automatically deployed. Different autodeployment settings may lead to different autodeployment outcomes. Depending on what a given user specifies for the configuration parameters, later user activity may or may not be sufficient to satisfy the condition(s) that are based on the parameters. If the user activity satisfies the condition(s) for a software component, the software component may be automatically deployed in the user's computing environment. If not, the software component may not be automatically deployed in the user's computing environment.

User-specified preferences may be stored as parameters and expressed or adjusted using checkboxes, slider bars, text boxes for inputting scores, drop-down lists for making selections, or in any other manner via the autodeployment configuration interface. The preferences may be expressed in a manner that is generic with respect to individual software components in the sense that the preferences are applied to all software components or to a subset of software components such as software components of a specific type or with specific characteristics or functionality, regardless of which software components have those characteristics or provide that functionality. The preferences may be applied to software components that exist or were known to the system manager as candidate software components at the time the preferences were specified as well as software components that did not exist or were not known to the system manager as candidate software components at the time the preferences were specified. In this manner, preferences may be provided that allow flexibility in autodeployment of known and unknown software components, while maintaining user preferences with respect to those autodeployment activities.

In one embodiment, the autodeployment configuration interface allows users to adjust privacy constraints for software components that may be autodeployed without knowing which software components will actually be autodeployed. The privacy constraints may specify, for example, that the privacy boundaries of new software components cannot extend beyond privacy boundaries of existing software components. For example, if existing software components cannot access pictures, then new software components would also not be expected to access pictures. As another example, if existing software components cannot trigger notifications, the new software components would also not be expected to trigger notifications. In yet another example, the user may decide to allow new software components to access pictures and/or trigger notifications even if existing software components cannot. The autodeployment configuration interface can enforce these privacy expectations, as configured, on behalf of the user, and these configurations may be expressed in absolute terms or relative to current settings of existing software components such that changing the settings of existing software components automatically changes the settings allowed for new software components.

The autodeployment configuration interface may include an option for a user to specify which zero, one, or more certifications are required in order to autodeploy an software component. For example, the user may specify that certifications by Oracle® Corporation and/or by a local municipality are required before a software component such as an app can be autodeployed for the user. The certification process may require security review by the certifying authority as well as a payment of a fee to support the cost of the security review. In one embodiment, the user selecting a certification prerequisite may need to subscribe to the certification, which allows the user to share a cost of the security review process for the shared benefit of autodeployment of software components.

In various embodiments, the autodeployment configuration interface provides options for the users to create, add to, or remove from a whitelist and/or blacklist. The whitelist identifies criteria or software components that should be allowed for autodeployment and will be autodeployed if their autodeployment utility score meets the prediction threshold, and the blacklist identifies criteria or software components that should not be allowed for autodeployment and will not be autodeployed even if their autodeployment utility score meets the prediction threshold. The whitelist and/or blacklist may cover whitelisted software components, blacklisted software components, whitelisted functionality, blacklisted functionality, whitelisted types of software components, blacklisted types of software components, whitelisted software component sources or providers, and/or blacklisted software component sources or providers. For example, a user may blacklist all social media types of software and whitelist all word processing types of software. As another example, the user may whitelist all software from Oracle® Corporation and/or all software marked as safe by Oracle® Corporation and blacklist all software from Acme Corporation. In this manner, third party plug-ins may be whitelisted as safe even if they are not known to the user as long as the plug-ins are offered by a particular provider or otherwise marked as safe by a particular provider.

In one embodiment, whitelisted software components may be weighted higher for autodeployment than non-whitelisted software components, and/or may undergo fewer privacy, security, or cost checks than non-whitelisted software components prior to autodeployment. The blacklisted software components may be blocked from autodeployment even though they would otherwise be available for a system manager to autodeploy in the user's target environment.

The autodeployment configuration interface may include an option for specifying when the system manager should perform the autodeployment analysis. The user may select real-time predictions or near-real-time predictions that occur synchronously based on user activity ingested and processed. As another option, the user may select periodic or scheduled autodeployment analysis and responsive operations, for example, to promote autodeployment during user-designated times of the day, week, or month when the user is not expected to be actively using bandwidth and/or processing resources in the target computing environment.

The autodeployment configuration interface may also include options to set resource usage limits for autodeployment processes. These resource usage limits may prevent the system manager from consuming beyond a threshold amount or percentage of CPU, memory, and/or network bandwidth, to mitigate any impacts of autodeployment on system performance of the target computing environment.

For a variety of different configuration settings and/or other utility characteristic(s) (or reasons that autodeployment of a software component may or may not be beneficial to the user), the user-specified parameters may indicate weights of the utility characteristic(s). When analyzing user activity to determine whether or not to autodeploy software components for the user, any raw values of characteristics that would normally impact an autodeployment utility score may be scaled or "weighted" according to the weights specified by the user in the configuration settings, if any, to generate weighted values of utility characteristics that may be taken into account instead of the raw values when generating the autodeployment utility score.

In one embodiment, the autodeployment configuration interface includes an option to set a prediction threshold. The prediction threshold may be adjusted by changing the autodeployment utility score minimum and/or prediction confidence minimum in order to autodeploy a software component. Such an adjustment may be provided, for example, by a slider, where a lower prediction threshold leads to a more aggressive autodeployment of software components based on lower confidence that the software components will be used, and a higher prediction threshold leads to a less aggressive autodeployment of software components based on higher confidence that the software components will be used.

In one embodiment, different thresholds and other preferences may be specified for different possible types of autodeployment. For example, the preferences may be specified as the same or different for any of automatically downloading software components, automatically unpacking software components (in which case resulting useable and natively referenceable software artifacts may consume more space than compressed artifacts that are not natively referenceable), automatically installing software components, automatically configuring software components, and/or automatically activating software components. In one embodiment, the user may specify that certain types of autodeployment require user input to complete while other types of autodeployment do not require user input to complete. For example, the user may specify that software may be downloaded automatically for software components above a first autodeployment utility score, within a certain space allocated for yet-to-be-used autodeployed software components, may be unpacked automatically once downloaded, may be installed automatically for software components above a second autodeployment utility score above the first autodeployment utility score, may be automatically configured once installed, but may not be automatically activated without prompting the user whether to activate the software component. In other examples, different types of autodeployment have other different settings, thresholds, and preferences depending on the user's configuration settings.

In one embodiment, settings entered by a user (such as an admin user or an autodeployment expert) on the autodeployment configuration interface may be saved for and applied to multiple tenant organizations (e.g., a default setting by the service provider), a single tenant organization of a multi-tenant cloud (e.g., a default setting for the company where different companies have different default settings that are opaque to each other), or any other group of users (e.g., a default setting for an organization within the company) such that individual users do not need to specify all autodeployment configuration settings separately but may benefit from the autodeployment configuration settings made by other users in their cloud infrastructure tenancy or other user group. Settings may be marked as "user-specific" or "group" settings, where user-specific settings may override or supplement group settings and group settings may apply in the absence of or in addition to user-specific settings. For example, a user may blacklist a software component with a user-specific setting, which could override a group setting that whitelisted the software component and/or could supplement group settings that blacklisted other software components but not the software component.

In one embodiment, autodeployment configuration settings may be learned for users with different roles, privileges, expertise, responsibilities, or with different patterns of software components installed (which may also indicate expertise), and these settings may be applied to a user in the absence of being overridden with a user-specific setting. These learned autodeployment settings may be displayed to the user in the autodeployment configuration interface so the user can make a selection to opt into or out of the learned setting.

In one embodiment, some users may not have privileges to adjust tenant-wide settings, group-wide settings, and/or even their own user-specific settings. An organization may prefer, for example, that users performing tasks in a factory have applications when applicable on the factory floor without needing to wait for the next applicable application to load. In such a use case, having the application autodeployed when applicable may be a safety or efficiency issue set by an administrator for the organization or other privileged user that cannot be overridden even by individual users for themselves. In various other embodiments, individual users have the ability to override any default setting for their group or tenancy but not necessarily the ability to set default settings for their group or tenancy. Such default settings may be reserved for privileged users in the group or tenancy, or may be available to all users in the group or tenancy.

The autodeployment configuration interface may also include options for notifications about the autodeployment operations before the autodeployment operations start, as the autodeployment operations proceed, and/or after the autodeployment operations have completed. The notifications may have different types at different stages, depending on the specified preference in the autodeployment configuration interface. For example, the user may want to receive an email prior to starting autodeployment, a pop-up notification as the autodeployment operations begin, and/or a message on a software component platform's landing page when the autodeployment operation has completed. These different types of notifications may be different for different stages in different configurations, and other types of selectable notifications may include, but are not limited to text messages, highlighting the newly installed software component on a menu or navigation interface, audible notifications such as a bell or chime, and/or a message to a project manager, organization manager, or another user other than the configuring user about the autodeployment of the software component.

For advanced users, the autodeployment configuration interface may include options for determining which machine learning models and/or algorithms are used for processing or tagging user activity, determining the autodeployment utility score, and/or for determining to autodeploy software components. The available models and algorithms may be listed on the interface, and the user may select or de-select available models and algorithms to whitelist or blacklist the models or algorithms for use. The whitelisted algorithms or models may be available for usage depending on the data patterns involved, and the blacklisted algorithms or models may be prohibited from usage despite the data patterns involved. In a particular example, the user may turn off use of large language models, or may disallow any large language models in use from learning based on the user's individual activity.

Figure 2A:
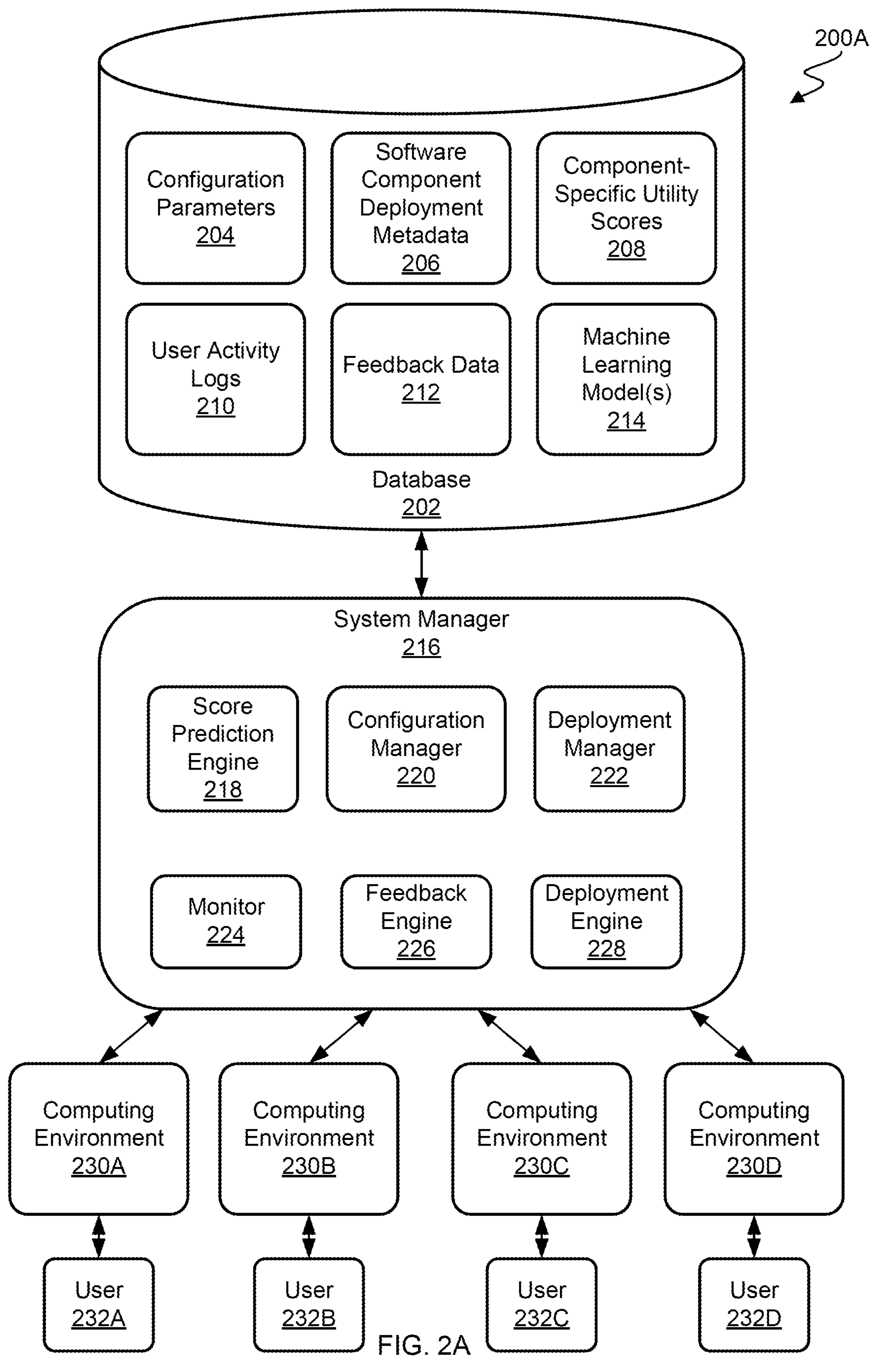
FIG. 2A illustrates a diagram of an example system for autodeploying software components using a centralized system manager.
Figure 2B:
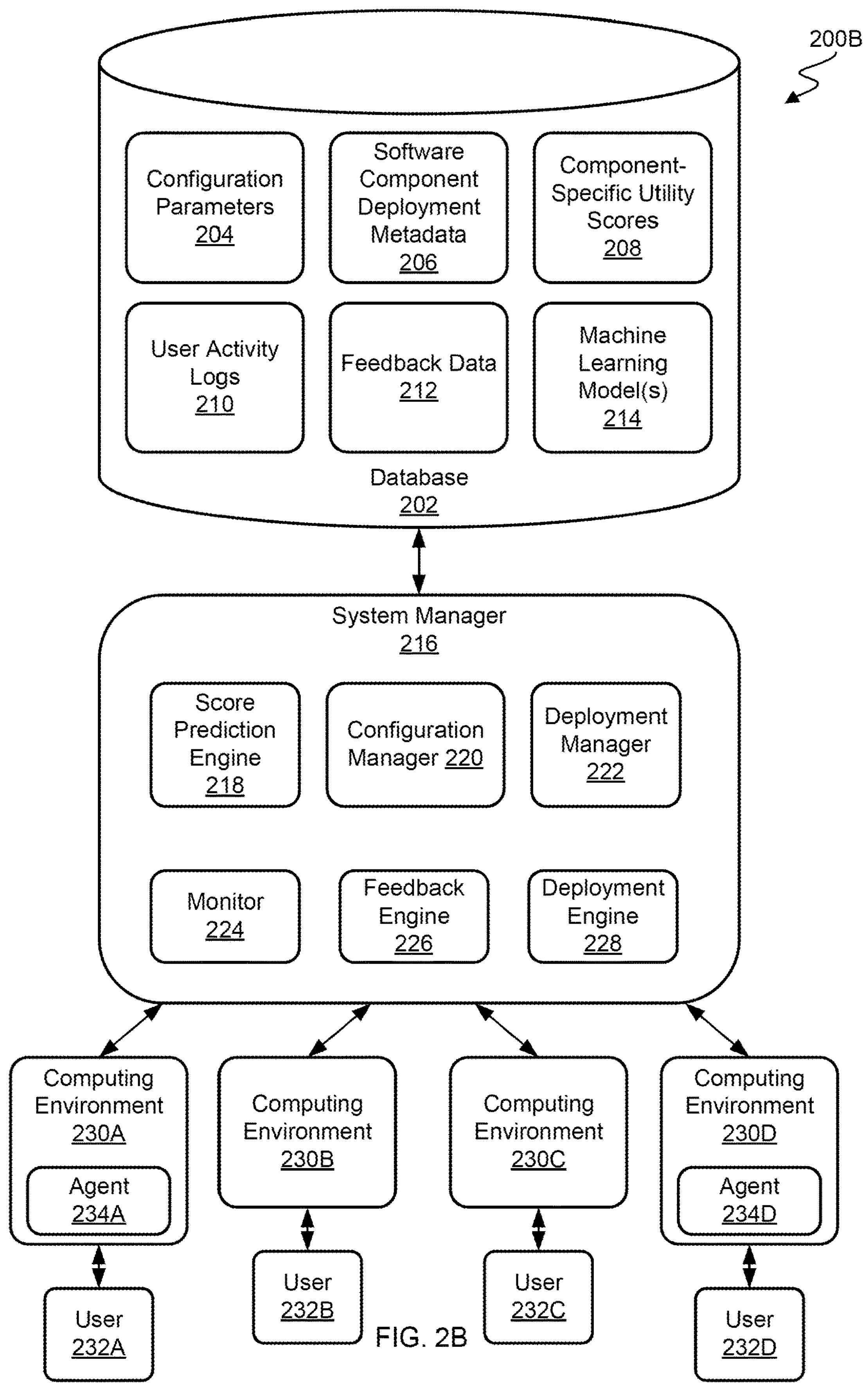
FIG. 2B illustrates a diagram of an example system for autodeploying software components using hybrid system management functionality that uses agent in target computing environments.
Figure 2C:
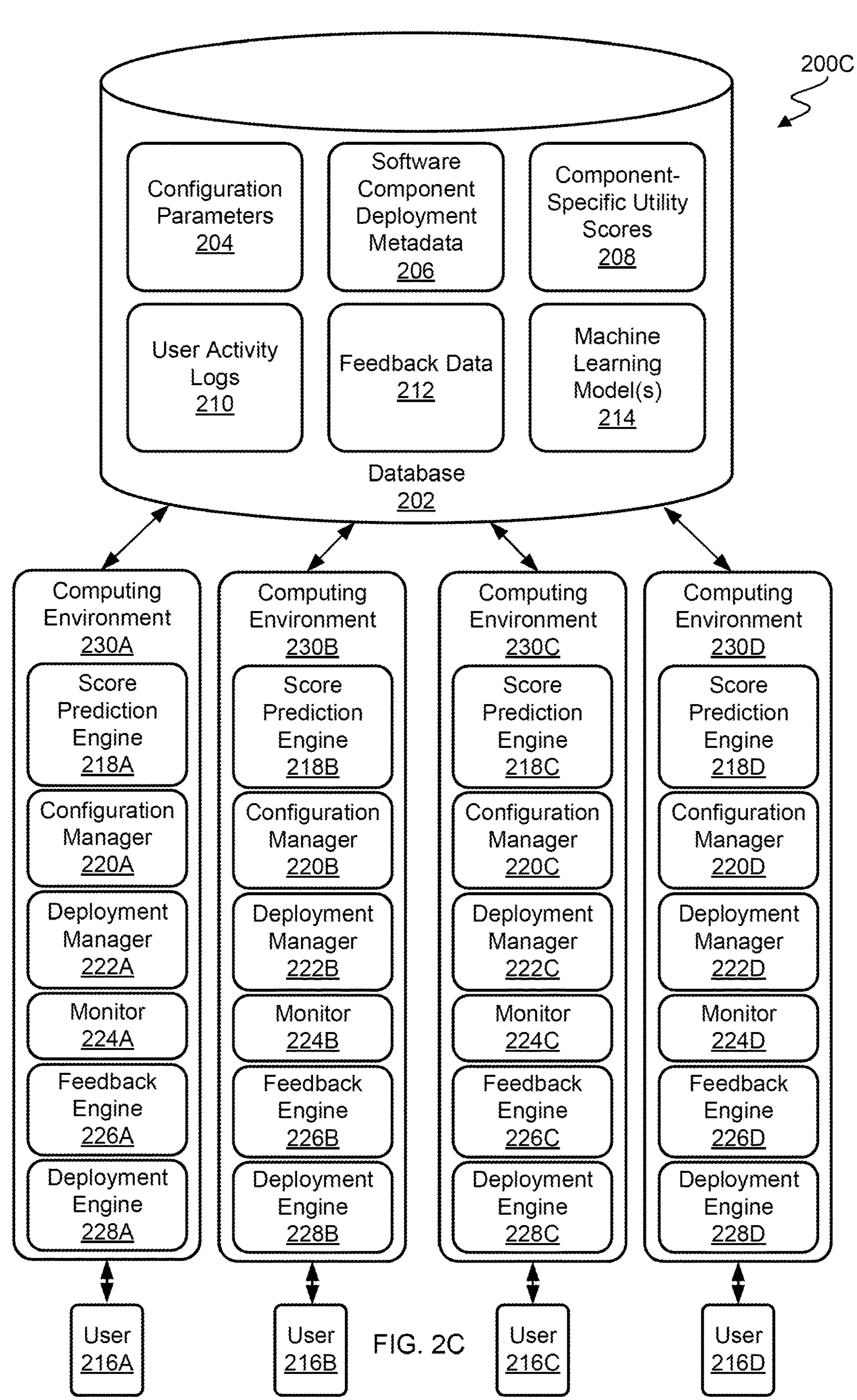
FIG. 2C illustrates a diagram of an example system for autodeploying software components using system managers distributed among target computing environments.

FIGS. 2A, 2B, and 2C illustrate diagrams example systems for autodeploying software components. As shown, configuration parameters 204 may be stored in a database 202. Database 202 may be any storage accessible to system manager 216, as shown in FIG. 2A-2B, or accessible to computing environments 230A, 230B, 230C, and 230D, as shown in the embodiment of FIG. 2C where system manager functionality is distributed among the computing environments. As shown in FIG. 2A, system manager 216 includes configuration manager 220 for hosting an autodeployment configuration interface and gathering configuration parameters 204 for storage in database 202. In FIG. 2B, system manager 216 may include a configuration manager 220 for gathering configuration parameters 204, and computing environments 230A and 230D may alternatively or additionally include agent 234A and 234D, respectively, for reporting configuration parameters to the system manager 216. In FIG. 2C, computing environment 230A, 230B, 230C, and 230D include a configuration manager 220A, 220B, 220C, and 220D, respectively, for gathering configuration information from users and storing configuration parameters 204 directly in database 202.

Maintaining Software Component Deployment Metadata

Referring back to FIG. 1, process 100 further includes block 104, where the system manager stores metadata about candidate software components. For example, the metadata may identify which software components are available for autodeployment for different users based on what software components are already installed for the different users and/or what software components have been blacklisted or otherwise blocked for installation for the different users. The different software components available for autodeployment may vary from user to user. As shown in FIGS. 2A, 2B, and 2C, software component deployment metadata 206 may be stored in a database 202. Database 202 may be any storage accessible to system manager 216, as shown in FIG. 2A-2B, or accessible to computing environments 230A, 230B, 230C, and 230D, as shown in the embodiment of FIG. 2C where system manager functionality is distributed among the computing environments.

In one embodiment, the software component deployment metadata indicates which functionality is provided by which software components. Software components may have overlapping functionality or non-overlapping functionality with other software components. For example, an example user in an example environment may have only one candidate inventory tracking software component but may have several candidate person-to-person messaging software components.

Beyond merely identifying the available software components and/or items of functionality, the software component deployment metadata may also provide additional context about the software components and/or items of functionality. Such information may be provided by users who have tagged the software components and/or items of functionality with additional contextual information, or from a machine learning model that tags the software components and/or items of functionality with additional context. For example, a log of software component usage may include a name or base description of the software component, a name or base description of a function, and/or a name or base description of a variable used within the software component. A machine learning model may use natural language processing and keyword clustering to process a logged name of the software component, function, navigation items, triggered functionality, function calls, links, names or contents of inputs and/or outputs, a variable name such as a variable that references certain functionality or prepares data for another software component, or other tools to determine what the software component and/or function are used for, and the software component may be tagged with a tag that indicates the corresponding functionality. The software component may be tagged with multiple tags in this manner, and the tags may be used to determine which software components offer which functionality. Tags may also be included by default by the system manager for some software components, for example, at the time the software components are added to a library of available software components for the system manager. In another example, tags may be added by users who are familiar with the software components, and these tags may be applied for other users, for example, in the same tenancy or other group as the tagging users.

In one embodiment, the system manager prompts a large language model (LLM) with information gathered about software components to generate tags to further label the software components with functionality, or to further tag items of functionality with other software components. For example, the system manager may discover that a software component is tagged with "word processing" functionality and prompt an LLM for which other software components among a named set of provided software components and/or an unnamed set of software components otherwise known to the LLM also include "word processing" functionality. For example, the LLM may use names or base descriptions of software components and/or functionality provided in the prompt, as well as background information known to the LLM to determine tags that match the names or base descriptions. The LLM may determine which software components to add to the profile for "word processing" based on the prompt, and the system manager may update the word processing profile to include the named software components. As another example, the system manager may discover that users are frequently using a new Acme application and may prompt the LLM to identify which functionality among a named set of provided items of functionality and/or an unnamed set of items of functionality otherwise known to the LLM are also performed by the Acme application. The LLM may determine which items of functionality to add to the profile for the Acme application based on the prompt, and the system manager may update the Acme application profile to include the named items of functionality. Whether or not named items of functionality or named software components are provided as known tags for a specific prompt, the system manager may provide examples of tags that, while they may not be valid for the specific prompt, help provide context to the LLM for determining what other tags to identify in response to the prompt. The prompt may also include metadata that specifies how the results are to be provided, such as in a comma separated list, in JSON or XML format, etc.

In one embodiment, new software components discovered as a result of prompting the LLM, querying a set of supported software components of a software component platform, or manually by one or more users may be added to the set of candidate software for autodeployment if the newly discovered software components satisfy certain criteria, such as privacy and security criteria. In one example, the system manager ensures these criteria are satisfied by limiting availability of newly discovered software components to those components that are from a trusted source. In one embodiment, the download link for a new software component is discovered via a web search, and the installation steps for the new software component are discovered by monitoring user inputs as the new software component is installed manually by a user. The monitored inputs may be emulated in the foreground or background for autodeployment with respect to another user.

Monitoring User Activity and Software State

Referring to FIG. 1, process 100 further includes, in block 106, training a machine learning model on logs of user activity to predict utilities of autodeploying software components. As shown in FIGS. 2A, 2B, and 2C, user activity logs 210 may be stored in a database 202. Database 202 may be any storage accessible to system manager 216, as shown in FIG. 2A-2B, or accessible to computing environments 230A, 230B, 230C, and 230D, as shown in the embodiment of FIG. 2C where system manager functionality is distributed among the computing environments. As shown in FIG. 2A, monitor 224 gathers monitors computing environments 230A, 230B, 230C, and 230D for user activity information to store in database 202 as user activity logs 210. In the embodiment of FIG. 2B, agents 234A and 234D may send or push user activity information to monitor 224, for storage in database 202 as user activity logs 210. Monitor 224 may pull such activity information from computing environment 230B and 230C, for example, if monitor 224 is integrated into a deployment or use process for computing environment 230B and 230C. In the embodiment of FIG. 2C, computing environments 230A, 230B, 230C, and 230D include monitor 224A, 224B, 224C, and 224D, respectively, and monitors 224A, 224B, 224C, and 224D may communicate directly with database 202 to update activity logs 210.

In various embodiments, a system manager gathers information about user activity on a local device for reporting to a cloud environment that support a variety of local devices of a variety of users, in a cloud environment as reported from a variety of local devices of a variety of users, in an operating system environment as a tracking of deployed and removed software for reporting to a cloud environment, in an app store environment as a tracking of users of the app store, or in any other environment where deployment and/or use activities from a plurality of users can be tracked for the benefit of making autodeployment determinations for individual users.

The system manager may predict software components that may be beneficial for autodeployment and deploy the predicted software components in anticipation of user needs or future user activities, which may be determined based on monitored user activity data, project requirement data, and/or other relevant data. The system manager analyzes user behavior, project requirements, and/or other relevant data to proactively install software components before or without such components ever being explicitly requested.

In one embodiment, activity of a particular user in an application or software component, or activity from other users in an application or software component, may initiate a project that is assigned to or undertaken by the particular user. As a result of the initiated project, the system manager may detect historical activities that other users have performed when similar projects have been initiated and assigned to or undertaken by the other users. Items of software functionality and/or software components may be detected as being used in the historical activities of other users, and information about the items of software functionality and/or software components may trigger an autodeployment of a particular software component in a target environment of the particular user. In another embodiment, a newly initiated project may be mapped to a set of software components needed to complete the project, for example, by a project lead. Upon assignment of the project, the set of software components may be autodeployed for the particular user, to the extent that any such components are not already deployed. In some embodiments, a cluster of software components may be determined to be highly relevant to the initiated project based on historical user activity data and/or a user-provided mapping, and the full cluster of software components may be autodeployed for the particular user, to the extent that any such components are not already deployed.

User activity may be tracked to determine what patterns of software component usage, so a machine learning model may predict which software component is likely to be used next. Usage may be tracked at the download level by storing activity logs that identify which users have downloaded which software components and when, at the install level by storing activity logs that identify which users have installed which software components and when, at the activation or application usage level by storing activity logs that identify which users have used which interfaces that depend on which software components, and/or at the functional level by storing activity logs that identify which users have invoked which function calls or functionality from which software components.

Partial user activity may also be tracked, such as partial downloads, partial installs, partial activation or application usage, or partial functionality usage. For example, user may have initiated activity in a session, and the session may have been terminated before the activity was completed. Partial user activity may count as full user activity or as a fraction of full user activity for use in determining whether a user is likely to use a software component. In one example, the fraction is determined based on how much of the partial user activity occurred. For example, a download of 25% of the software component may count as 0.25 downloads of the software component.

User activity and activity logs may be mined from a variety of sources, including other software components and software component platforms that are active on user devices. User activity may be collected in the background by the various sources and, if remote to the system manager, transmitted to the system manager for storage and analysis. The activity may be measured at different layers of the software stack collected by different sources, such as system-level metrics about downloads and installations on the system, application-level metrics such as user interface components and navigation elements used in the application, application-platform-level metrics such as information about software components being added to or removed from the application platform(s), provider-level metrics such as which users downloaded, installed, and/or logged in to which application(s) offered by the provider, and any other source that is involved in any aspect of software deployment that has the ability to track interactions with that aspect of software deployment.

Such data sources may feed into the system manager, whether the system manager is hosted locally on a user device or hosted in the cloud to support different local autodeployment agents on different user devices. If the system manager or an agent of the system manager is operating locally on the user's device in the target computing environment, the system manager or agent may perform analysis, determinations, and/or receive results from analyses or determinations made to autodeploy software components even while the system manager operates in the background as other software components are active or even while the device is otherwise inactive and not in use. The autodeployment may then occur even while the user is away from the device or while other software components are active on the device, utilizing bandwidth and/or processing resources but without disrupting user activity on the device or activity of the other software components.

The system manager may track the percentage of users in a tenancy or other group for which different software components were automatically deployed and, of those software components and users, the percentage of users that actually used each autodeployed software component, on a software component by software component basis, optionally with metrics tracked separately for different user groups, roles, and/or user characteristics. The percentage of users historically using each software component may also be tracked in combination with how long after the autodeployment such users used the software components, to determine a mean, median, or mode delay in using the software components after autodeployment for the percentage of users that used the software components at all. Such information helps a machine learning model to predict a likelihood that a software component will be used within a time window if autodeployed for another user in the same group or otherwise having same or similar roles and/or characteristics. For example, a Bayesian network may be constructed, where nodes in the network correspond to software components that have been used in the past and edges between nodes in the network may be bidirectional to indicate the probability that the software components are used together and/or unidirectional to indicate the probability that earlier use of one software component leads to later use of another software component.

In one embodiment, a software component platform, such as a cloud-based application with various optional features, is installed in a software environment accessible to a user, and the software component platform has several optional software components that may or may not be downloaded, unpacked, installed, configured, activated, and/or subscribed to with the software component platform. User activity with respect to software components that are installed for the software component platform may be tracked by a system manager to determine whether to recommend other software components that are not yet downloaded, unpacked, installed, configured, activated, and/or subscribed for the software component platform.

In another embodiment, different software component platforms are installed and other software component platforms may not yet be installed in a software environment accessible to a user, and the different software component platforms may have various optional software components that are or are not downloaded, unpacked, installed, configured, activated, and/or subscribed to with the different software component platforms. Each of these different software components in the different software component platforms may offer different interfaces and functions associated with same or different tagged functionality. User activity with respect to the different software component platforms and their corresponding software components that are installed may be tracked by a system manager to determine whether to recommend other software components that are not yet installed in the software environment accessible to the user.

The software component platform may be an application platform that offers, to users, a variety of optional software applications. For example, the applications may be listed separately in an app store for the application platform. User activity may be tracked by a system manager operating on the application platform to determine that users who frequently downloaded Prime® Video, Alexa®, and Amazon® Shopping also frequently downloaded Amazon® Music.

Information gathered from various data sources may be cleaned, normalized, and preprocessed so the data is representative of an amount of user interaction that occurred with a software component or item of functionality, and/or representative of a future amount of functionality or software component usage that is indicated by activity. For example, the initiation of a large project that is likely to involve several software components may be weighted higher than the sending of a single message from a single software component.

In a particular embodiment, application components log contextual information such as names of navigation items, triggered functionality, function calls, links, names or contents of inputs and/or outputs, or other tools used or triggered by users. These logs may be parsed to generate historical functional user activity which may or may not be specific to individual software components. For example, the logs may indicate that a user performed people search functionality whether or not the logs indicate which software component was used to perform the people search functionality. Such information may be used to increase the likelihood that a given user who performed such people search functionality will use applications that perform people search functionality (i.e., a current overlapping interest), or will use applications that perform functionality that is often performed after people searches (e.g., a messaging application or a sales application).

Additional contextual information may be stored as tags or other metadata in a profile for the software component or item of functionality. For example, a profile for a software component may include tags for a variety of items of functionality mapped to the software component, allowing a machine learning model to efficiently find and boost an autodeployment utility score for the software component when a pattern is detected based on the tagged functionality. As another example, a profile for the item of functionality may include tags for a variety of software components mapped to the item of functionality, allowing a machine learning model to efficiently find the and boost an autodeployment utility score for other software components tagged for the item of functionality when a pattern is detected based on a software component that has also been tagged for the item of functionality. In this manner, heterogenous patterns may be detected and managed that use software components and functionality interchangeably.

In one embodiment, tags carry a weight that indicates a strength of the relationship between the tag and the profile item being tagged. For example, a payroll application may have a high weight for a payroll tag, but a people data management application that supports some payroll functionality may have a medium weight for a payroll tag. These weights may be hard-coded between items of functionality and software components, or learned from user interaction data with software components that indicate such functionality is present.

The machine learning model may consider patterns in functionality alone or in combination with patterns in specific software components. In one embodiment, detected patterns may indicate that specific software components are often used after certain functionality is used, or that certain functionality is used after specific software components are used. In this manner, the functionality that is generic to software components and the specific software components may be detected together in heterogenous patterns that allow both types of inputs. In a first example, the usage pattern is functionality A, software component A, functionality B. In a second example, the usage pattern is software component A, functionality A, software component B. In the first example, a machine learning model may learn that software components having functionality B are often used after functionality A is used then software component A is used. The pattern may be applied equally or in a weighted manner the improve a likelihood of use or software component utility score across software components that offer functionality B when a given user uses functionality A then software component A. In the second example, a machine learning model may learn that software component B is often used after software component A and functionality A are used. The pattern may be applied to improve a likelihood of use or software component utility score across software component B when a given user uses software component A then functionality A.

Different items of user activity represented within or across user activity logs may be tagged with items of functionality to which the user activity has been detected to pertain, and/or software components to which the user activity has been detected to pertain. As a result, the system manager may construct a time series of tagged user activity associated with different users to provide as training data to a machine learning model to predict what items of functionality and/or software components will be relevant to future user activity that matches historical patterns.

In one embodiment, the system manager may also collect and analyze device location information in association with downloading, unpacking, installing, configuring, activating software components, and/or subscribing to a software services agreement to support the software component on a mobile device. The location information may indicate that users who are within 100 yards of a given set of coordinates for a threshold amount of time frequently install a particular software component that may be associated with that location. For example, users near a Safeway® location for more than 10 minutes may frequently download the Safeway® app on an app store, but they may not download the app when they are not near that location or are only ephemerally near that location, for example, in transit. As another example, users approaching a parking garage location may frequently download a parking garage app on an app store, particularly if they are using a maps application to navigate to the address of the parking garage. In this example, the navigation address may be reported by a mapping application and used optionally in combination with a device location to automatically download the parking garage app.

In one embodiment, the system manager prompts a large language model (LLM) with information gathered about user inputs monitored, buttons clicked, functions called, and/or results obtained in order to match the meaning of the user inputs with known or unknown functionality and/or software components. For example, the system manager may determine that a user clicked on a "submit" button based on a name of the button, as a result of monitoring the user input. The system manager may also determine that a user typed in text in various input fields after clicking the submit button and then clicked another button named "PayPal". The system manager may prompt the LLM with information about the monitored user activity, including, in the example, the name of the items selected and content of the text typed, to discover what the user was doing in the application. For example, the prompt may include "What was a user doing by clicking a 'submit' button, then providing the following information: 'John Smith', '500 Oracle Parkway', 'Redwood City, California', then clicking a 'PayPal' button?" The prompt may also include information about existing items of functionality and/or software component tags as examples, whether or not such items of functionality and/or software component tags are to be used in the response. The LLM may determine, as a result of the prompt, that the user activity should be tagged as "procurement" or "purchasing" activity, and the user activity may also be tagged with the software component, "PayPal". The prompt may also include metadata that specifies how the results are to be provided, such as in a comma separated list, in JSON or XML format, etc.

Determining Autodeployment Utility Scores

In FIG. 1, once the configuration parameters, metadata about candidate software components, and trained machine learning model are in place, the machine learning model may receive and process user activity logs in blocks 108-118 to determine whether to autodeploy software components. In block 108, the system manager receives log(s) of user activity by a particular user in a particular computing environment. Then, in block 110, the system manager uses the machine learning model to analyze the log(s) of user activity by the particular user. In the example shown, autodeployment utility scores for a first software component, a second software component, and a third software component are updated or otherwise determined by the system manager in blocks 112, 114, and 116, respectively. In block 118, the system manager determines whether the first, second, or third software components satisfy the condition(s) according to the user-specified configuration parameters. If the condition(s) are satisfied, autodeployment is triggered for the software component(s) that satisfy the condition(s) in block 120. If the condition(s) are not satisfied, the system manager continues monitoring the remaining component(s) in block 122.

Referring back to FIG. 2A, system manager 216 trains machine learning model(s) 214 based on user activity logs 210. For new user activity detected by monitor 224, system manager 216 uses score prediction engine 218 to predict an autodeployment utility score for the corresponding user 232A, 232B, 232C, and/or 232D. Determined component-specific autodeployment utility scores 208 may also be maintained in database 202, as shown, such that the autodeployment utility scores get updated only when new user activity is detected by monitor 224. Deployment manager 222 determines whether the autodeployment utility score for a given software component satisfies condition(s) as specified in configuration parameters 204. If the condition(s) are satisfied, deployment engine 228 deploys the software component to the corresponding computing environment 230A, 230B, 230C, and/or 230D based on the predicted utility score for user 232A, 232B, 232C, and/or 232D, respectively. If the condition(s) are not satisfied, monitor 224 continues monitoring user activity from computing environments 230A, 230B, 230C, and 230D.

The system manager determines autodeployment utility scores for software components by predicting (a) how likely users are to deploy the software components in certain scenarios or based on certain patterns, and/or (b) how much autodeployment of the software component is expected to benefit the users when the prediction turns out to be correct and/or cost the users when the prediction turns out to be incorrect. The autodeployment utility score provides a predicted degree of utility of the particular software component, if deployed, for a user or group of users for which the score was determined. The system manager uses a machine learning model or combination of machine learning models to support the prediction. The model(s) are trained using historical data about user activity, projects undertaken, and software components used. The model(s) may be evaluated based on how accurate the model(s) predict whether users will use software components within a certain period of time, how much software components get used after autodeployment, how often software components go unused after autodeployment, how often software components get removed after autodeployment, and/or any other factor that indicates the utility of the software components to the user.

Autodeployment utility scores may be determined for different software components and compared to each other and/or compared to thresholds or condition(s) specified in the autodeployment configuration settings to determine which software components to autodeploy, if any. Autodeployment utility scores may be recomputed when user activity is received that impacts the autodeployment utility score. For example, if a user begins using a new software component that the user has never used before, such new user activity may be part of a pattern or trend among users to use software components from a cluster of software components. In this example, one or more software components from the cluster may be autodeployed for the user in anticipation that the user will also satisfy this pattern or trend.

In one embodiment, the system manager uses the logs of tracked user activity to determine which applications are most likely to be used after which other applications. The system manager may support a multi-tenant and/or otherwise multi-user environment where different users exhibit patterns of software usage, some of which are more common than others. Based on these patterns of software usage, the system manager may train a machine learning model to predict what software components are likely to be used next by a user who has used a given history of software components and/or a given history of functionality from a given history of software components. The prediction by the machine learning model may be probabilistic in nature, with several different software components that may be used next for a given user, each having different probabilities of being used next based on the software component and functionality usage history from a set of users.

In one embodiment, autodeployment utility scores are calculated for candidate software components based on a likelihood that the candidate software component will be used over a time window or amount of time, or ever, and/or based on a cost or benefit of autodeploying the candidate software component. Different candidate software components may have different likelihoods of future use as well as different costs or benefits of autodeployment. For example, one candidate software component may have a higher autodeployment cost relative to other candidate software components due to a space consumption that is larger than the other candidate software components. In another example, a candidate software component may have a higher autodeployment cost relative to other candidate software components due to an installation or configuration process that consumes more computing resources than other candidate software components. In another embodiment, the autodeployment utility score accounts for a cost includes a cost of rebooting or restarting other software components and/or software component platforms or taking other software components and/or platforms offline in order to install and/or activate a candidate software component. Alternatively or additionally, factors such as space consumed, computing resources consumed, network bandwidth consumed, spikiness of resource consumption (all at once or spread out over time), error rates of autodeployment, and/or other factors may be taken into account when determining a autodeployment utility score.

In one example of determining a probability of usage, the machine learning model may detect a pattern that software component C is often used after software component A and software component B have both been recently used. In this scenario, based on detecting that A and B have both been recently used, the machine learning model may assign a high probability to software component C to be the next software component that is used.

The machine learning model may assign a score to the probability or likelihood that the software component will be used. For example, a software component that is predicted to have a 50% likelihood of being used next may be assigned a probability score of 0.5, and another software component that has a 10% likelihood of being used next may be assigned a probability of 0.1. The probability score may be used by the same machine learning model or a different machine learning model to determine whether or not to recommend auto-deployment of the probability-scored software module.

The probability score may be specific to a type of autodeployment. For example, the probability score may be a probability that the user downloads the software component based on which users have downloaded which software components and when, a probability that the user installs the software component based on which users have installed which software components and when, a probability that the user activates or uses the software component in an application based on which users have used which interfaces that depend on which software components, and/or a probability that the user uses functionality offered by the application based on which users have invoked which function calls or functionality from which software components.

Probabilities determined from different sources, different models, or different components or items of functionality may be combined to improve a confidence of the user's next action. For example, if two software components offer similar functionality, as indicated by metadata stored about the software components, a high likelihood that the functionality will be used next may lead to a medium likelihood that either software component will be used next. If one of the two software components is used slightly more than the other for the similar functionality, the more frequently used software component may have a high likelihood of being used next based on both the functionality probability score and the software component probability score.

In one embodiment, the machine learning model may account for user roles when considering historical activity and discover patterns among users with same or similar roles or other same or similar characteristics. The patterns discovered among users with same or similar roles or characteristics may be weighted higher in determining the autodeployment utility score than patterns discovered among users with different roles or characteristics. Roles may be related to job function or responsibility, for example, and user characteristics may relate to which organization the user is from, what location the user resides or works, the weather at the user's location, the traffic at the user's location, a tenure of the user at the organization, a time of day or night specific to the user's time zone, etc. Roles and other characteristics may also be used to detect trends in uptake of certain software components over time for users with same or similar roles or characteristics. Any such user characteristics may be used not only by the machine learning model in determining which users are similar for autodeployment purposes but also for scheduling and planning autodeployment processes.

In one embodiment, the system manager may autodeploy software components to one or more users that do not have any relevant historical activity based on roles or characteristics of the user. In this manner, users may be able to enjoy new software components relevant to their job description even before they start performing the job, based on what software components other users performing similar jobs have used in the past. In various embodiment, data about similar users may be used to suggest new software components within user groups, within a tenancy, or even, with privacy limitations in place to ensure unintended information is not being shared, between tenancies.

In various embodiments, the machine learning model calculates the probability score of using individual software components that are all equally possible for the user to use in a given time window but are not all equally likely for the user to use. For example, the user may be working on a variety of tasks, and the machine learning model cannot predict with certainty which task will be the next task, within the next second, minute, day, week, or month. The user may have the ability to jump between tasks arbitrarily and load different software components from any point during use of one or more applications or other software components. In other words, the software components themselves are not linearly or contiguously connected where some software components are adjacent to others, but where the software components are independently invokable or useable and do not necessarily require other software components in order to be used. This open-endedness and independence of the software components complicates the task of predicting which software component will be used next, as the machine learning model relies on historical patterns of user behavior with respect to applications and software components rather than on logical relationships and strict dependencies between the software components themselves.

In one embodiment, although many software components are independent from each other, a software component may depend on a particular software component platform to be installed before the software component may be used, or software components may be clustered together in a cluster or package of software components that are often used together, due to co-dependency of functionality or otherwise. These co-dependencies may be additional factors taken into account beyond mere historical usage patterns but still including the historical usage patterns in the analysis.

Different machine learning algorithms and corresponding models may be selected for different user metrics in order to predict an autodeployment utility score. If multiple algorithms and models are used to determine scores for autodeploying a particular software component, intermediate scores from the different algorithms and models for the particular software component may be combined together based on confidences and/or weights of the intermediate scores, to generate an aggregate autodeployment utility score. In one example, different algorithms and corresponding models are specialized for detecting different patterns. A first algorithm and model may receive time series data and account for leading or trailing correlations in the data over time to detect software components that lead to use of other software components later on, in sequence, and a second algorithm and model may receive data characteristics and cluster or classify the data characteristics to detect groups of software components that are frequently used by the same users, regardless of time delays. In another example, an algorithm and model may detect and store frequently occurring patterns of user activity as signatures by clustering the user activity and determining a representative sample of user activity for each cluster. If a signature includes a sequence of actions, the machine learning model may detect that a certain signature of user activity is partially matched and autodeploy any software components that would complete the signature. If a single algorithm and model is used, the algorithm and model may be chosen based on a variance of the data, a distribution of the data, a frequency or period of time during which the data is updated, a type of data involved, a type of pattern to be detected, and/or time constraints imposed on the determination of the autodeployment utility score.

In one embodiment, a Bayesian network may be constructed, where nodes in the network correspond to software components and/or items of functionality that have been used in the past and edges between nodes in the network may be bidirectional to indicate the probability that the software components are used together and/or unidirectional to indicate the probability that earlier use of one software component leads to later use of another software component. Software components and items of functionality may be merged on the same graph or represented in different graphs, and clusters of nodes with high correlation or edge weight between them may be grouped together and also treated as a separate node. For example, a first node may labeled as "Sales Order Management," a second node as "Fulfillment Management," a third node as "Advanced Pricing," a fourth node as "JD Edwards EnterpriseOne Sales Order Management," a fifth node as "JD Edwards EnterpriseOne Fulfillment Management," and a sixth node as "JD Edwards EnterpriseOne Advanced Pricing." In the example, the first three nodes correspond to items of functionality, and the last three nodes correspond to specific software components that have been used from the JD Edwards® EnterpriseOne® family of software components. The correlation of use among all six nodes may be high enough (e.g., above a first threshold such as 0.9 or 0.95) to cluster the nodes together as a supernode, called "JD Edwards EnterpriseOne Order Management," which can also be related to other software components via probability-driven edges. For example, JD Edwards® EnterpriseOne® Order Management may be related to a JD Edwards® EnterpriseOne® Warehouse Management node with a strong correlation to indicate a pattern (e.g., above a second threshold such as 0.7 or 0.8) but not a strong enough correlation to be clustered together as a single node. In this particular example, unidirectional edges may indicate that JD Edwards® EnterpriseOne® Order Management is used before JD Edwards® EnterpriseOne® Warehouse Management with a strength of 0.8, but that JD Edwards® EnterpriseOne® Warehouse Management is used before JD Edwards® EnterpriseOne® Order Management with a strength of 0.6. In the example, these edge strengths may be used to increase an autodeployment utility score making autodeployment more likely for JD Edwards® EnterpriseOne® Warehouse Management after JD Edwards® EnterpriseOne® Order Management has been installed, but not to increase the autodeployment utility score for JD Edwards® EnterpriseOne® Order Management (or not increase as much) after JD Edwards® EnterpriseOne® Warehouse Management has been installed.

In one embodiment, the machine learning model predicts different autodeployment utility scores for different time windows for the same software component, and also different autodeployment utility scores for different time windows for other software components. Such information may be used by the machine learning model to predict when to autodeploy a software component to maximize the expected benefit while minimizing or otherwise mitigating the expected cost. Such predictions may be made based on the tracked historical information about software component usage that includes information about how long a software component took to be used after autodeployment occurred, and when different items of functionality and software components were used in different detected patterns, including any time delays between such usage in the patterns. In one embodiment, the time information may also be stored as an edge in the Bayesian network. For example, an edge indicating that node B is used after ("trailing") node A 60% of the time, indicated by an edge weight of 0.6, may also include information about the average time delay, minimum time delay, maximum time delay, median time delay, and/or most frequent time delay between using node B and node A, for example, in seconds, minutes, or hours. The time delay may include information may be stored as metadata for the edge of the Bayesian network. Another edge with time delay metadata may be stored to indicate a probability and corresponding time delay for using node B before ("leading") node A. A bidirectional edge may also be stored to indicate a probability of using node A and node B, regardless of which node is used first, and an average time delay between the two.

Different edges or graphs may be generated to maintain data about different types of autodeployment. For example, edges may separately track probabilities for leading or trailing downloads between software components, leading or trailing unpacking of software components, leading or trailing installation of software components, leading or trailing configuration of software components, leading or trailing activation of software components, and/or leading or trailing subscription to software components. Such information may be used to predict future probabilities of downloads, unpacking, installation, configuration, activation, and/or subscription, based on which software components were downloaded, unpacked, installed, configured, activated, or subscribed-to first, with corresponding time delays and other metadata based on historical events embedded in the graph(s).

In various other embodiments, other machine learning models may be used, such as classifiers to classify or cluster frequent patterns in the user activity data, binary classifiers such as logistic regression to predict binary outcomes such as whether a software component will be used or not, decision trees to decide the next most likely software component, random forests to explore which software component is next most likely, support vector machines to divide and cluster common software component usage pathways, recurrent neural networks when the data includes sequences of user actions or project developments, to make sequence-dependent decisions about autodeployment, k-nearest neighbors to predict user activity based on similarity of past user activity, and other models that use unsupervised, semisupervised, or supervised algorithms to predict software components that will be used, re-used, and/or retained if autodeployed in a target environment. In one embodiment, as a result of clustering, software components that have been clustered together and are deployed in part by a user in a target environment may be autodeployed to completion of the cluster in the target environment.

In one embodiment, the user activity logs may indicate a pattern that the particular software component is used after a gap of time after other user activit(ies) having certain characteristic(s). In this embodiment, new user activity of a new user may be matched to the pattern by analyzing the new user activity to determine that the new user activity has certain characteristics similar to the certain characteristics identified in the pattern, and that an amount of time has passed relative to the gap of time. For example, users having a particular role may frequently install software component B on average 5 days after first using software component A, and this frequent user activity is stored as a pattern. Based on this pattern in the example, another user having the particular role that first used software component A 4 days ago may be matched to the pattern to determine if the other user is likely to soon install software component B. If so, the system manager may autodeploy software component B for the other user.

When determining the autodeployment utility score, the configuration parameters, which may be specific to a user or group of users, may indicate user-specified weight(s) of utility characteristic(s) for a software component autodeployment setting. The machine learning model may account for the weight(s) when determining the autodeployment utility score by scaling raw values of the utility characteristic(s) according to the user-specified weights to generate weighted utility characteristic(s). Scores determined for different users based on similar user activity may be different due to differences in weights specified for the different users. For example, one user may place a higher emphasis or importance on limiting bandwidth usage, while another user may place a higher emphasis or importance on aggressively exploring new software components that add new functionality beyond those that are installed for the other user. In this scenario, software components that require minimal bandwidth to install would be weighted higher for the first user, and software components that add new functionality would be weighted higher for the other user.

In one embodiment, the autodeployment utility score for a given software component includes a cost of removing another software component that would need to be removed in order to make space or otherwise free up resources for the given software component. The system manager may determine that the amount of resources needed to deploy the given software component is unavailable and find the other software component which is infrequently used or not used at all and/or would have a low autodeployment utility score if the other software component was not already installed. In this scenario, the system manager may automatically remove the second particular software component from the particular computing environment before completing automatic deployment operations for the given software component. Automatic removal may include uninstallation, repacking (e.g., re-compression), and/or full removal from the target computing environment's storage.

The configuration settings may guide how cost and likelihood of use play a role in autodeployment determinations. In various examples, a medium likelihood of use but medium cost may be prioritized over a higher likelihood of use and higher cost, or a higher likelihood of use and higher cost may be prioritized over a medium likelihood of use and medium cost. In one example, the cost may be multiplied by or otherwise combined with the likelihood to determine an expected cost that is actually incurred in an autodeployment scenario compared to a non-autodeployment scenario to normalize cost and likelihood score comparisons. In another example, a user may provide a higher weight in the configuration settings to either a likelihood of use or an autodeployment cost.

In one embodiment, determining an autodeployment utility score may account for an amount of resources available in the target computing environment compared to an amount of resources that would be consumed if the candidate software component is deployed in the target computing environment. If the amount of resources in the target computing environment is not enough to support the candidate software component, the autodeployment utility score may also account for a cost of uninstalling or deleting an existing software component, such as an unused, infrequently used, or not recently used software component, from the target computing environment before installing the candidate software component in the target computing environment. In this embodiment, the autodeployment utility score for the candidate software component may be the raw utility score for the candidate software component assuming space is available minus the raw utility score for the existing software component that is already downloaded or installed in the target computing environment.

The amount of resources available in the target computing environment may account for an amount of free space that should remain available to ensure uninterrupted functioning of the computing environment, and/or for a minimum or target amount of free space configured to remain available according to the user's configuration settings for autodeployment of software components. In another embodiment, an amount of resources available in the target computing environment accounts for an amount of space allocated for autodeployed software before such software has been opened and used by the user. Such autodeployed software may be capped in terms of how much space can be consumed until a user starts using the autodeployed software, in which case the autodeployed software may be moved out of the capped autodeployment space into a main storage space of the device.

In one embodiment, a cost of removing existing software components on a device to free up space for a new software component on the device may include a cost of deleting an unused software component that was autodeployed to the device but never used. In this example, the cost of re-downloading the existing software component, should the user later decide to use the existing software component, is balanced with the cost of downloading a candidate software component that the user is predicted to be more likely to use.

For example, if the software components are the same size and the existing software component, E, has a 25% chance of being used in the next week while the candidate software component, C, has a 50% chance of being used in the next week, then both software components are expected to be used (50%*25%) 12.5% of the time (scenario I), just the existing software component is expected to be used (25%−12.5%) 12.5% of the time (scenario II), just the candidate software component is expected to be used (50%−12.5%) 37.5% of the time (scenario III), and neither candidate software component is expected to be used (100%−50%−12.5%) 37.5% of the time (scenario IV). The expected value of replacing E with C saves a real-time download ($D_r$) 37.5% of the time (scenario III), represented as 0.375 $D_r$, but costs a real-time download ($D_r$) 12.5% of the time (scenario I), represented as 0.125 $D_r$, for a net real-time download savings of 0.375 $D_r$−0.125 $D_r$=0.25 $D_r$. Switching also costs an extra asynchronous (ahead-of-time) download, $D_a$, 100% of the time, as C would need to be downloaded in the case of a switch, whether C is used or not. The total savings of switching is then 0.25 $D_r$−$D_a$. If, in the example, the cost of a real-time download is four times higher than the cost of an asynchronous download, the cost savings would equal 0.25 (4 $D_a$)−$D_a$=0, which means the switch would not have a net cost-savings benefit.

The cost balance between a real-time download and an asynchronous download may be weighted differently in different scenarios. If C is much more likely to be used when readily available and much less likely to be used when waiting for a download, $D_r$ may be significantly higher than 4 $D_a$. If C is almost just as likely to be used when readily available as C is when waiting for a download, $D_r$ may be significantly lower than 4 $D_a$. Other transaction costs, such as increased network bandwidth sensitivities at peak traffic times or decreased network bandwidth sensitivities at low traffic times, may also factor into raising or lowering the cost, depending on whether the current sensitivity levels are also likely to be in effect during a real-time download of C or E. For example, a temporary decrease in network bandwidth sensitivity may cause $D_r$ to be a greater multiple of $D_a$ than normal due to the current low cost of $D_a$ and/or the potential future high cost of $D_r$ during a possible future time of increased network bandwidth sensitivity.

In another example, if the software components are the same size and the existing software component has a 10% chance of being used in the next week while the candidate software component has a 60% chance of being used in the next week, scenarios I-IV have the following probabilities: (0.6*0.1) 0.06 (scenario I), (0.1−0.06) 0.04 (scenario II), (0.6−0.06) 0.54 (scenario III), and (1−0.6−0.04) 0.36 (scenario IV). In this example, the real-time download savings of replacing E with C is (scenario III)*$D_r$−(scenario I)*$D_r$=0.54 $D_r$−0.06 $D_r$=0.48 $D_r$. In this example, the total expected value is $$0.48\ D_r - D_a.\ \text{If}\ D_r > \frac{1}{0.48} D_a$$

or 2.083 $D_a$, then switching would attain a positive expected value.

The cost balance may also be swayed if C consumes much more or much less space than E. On the one hand, if C is larger, then $D_r$ will be larger for C than for E. On the other hand, if C is larger, $D_a$ will also be larger for C than for E. Network bandwidth sensitivities may also have a greater impact for larger files and less of an impact for smaller files.

The cost balance may also account for an additional transaction cost that favors keeping data stored in a predictable location rather than moving data into and out of the target software environment. Other example costs include separate computing costs versus storage costs versus networking costs, and manual or automatic removal costs such as uninstallation costs if users frequently manually uninstall the software component or if the software component consumes so much space that the software component is frequently automatically uninstalled. The transaction cost and other more granular costs may be included in the cost balance equation.

In one embodiment, the cost balance accounts for an immediacy by which different software components may be wanted in different scenarios. For example, a user may search for some software components and perform a task if the software component is installed and immediately available or give up on the task if the software component is not installed or not immediately available. In other words, the value of the software component is greater if available immediately (through prior autodeployment) than if available on a delayed basis (without prior autodeployment), beyond the time lost to the delay itself. Such immediacy may be determined for different items of functionality offered by the different software components by observing frequencies of use by users who have the software components installed, in a given scenario following a sequence of user actions, compared to frequencies of installation by users who do not have the software components installed. In other words, a software component that is frequently used if present but not frequently installed may have a higher cost of not being immediately present than a software component that will be used anyway, whether immediately present or not. In another example, immediacy may also be measured based on how long the software component would be used, if present. Software components with short but situationally consistent use (e.g., consistently used in the same usage patterns when installed) may be needed more immediately than software components with longer and more open-ended or situationally independent use (e.g., used independently without a clear pattern when installed). In yet another example, immediacy may be measured based on how frequently the software component was used after the software component was manually installed as compared to how frequently the software component was used if already installed, with otherwise similar logged usage patterns of other software components. In this example, software components that were not used as frequently after waiting on a manual installation, even though the manual installation was requested, may have a higher immediacy than software components that were used whether or not manual installation caused a delay. Software components that have a higher immediacy of use would have a higher cost if not immediately present and a higher benefit if immediately present.

The machine learning model may also account for a frequency by which software components are uninstalled by users to gauge whether the software component should be autodeployed or not. Software components that are frequently uninstalled may carry a higher risk and higher average cost of autodeployment since those software components may involve a manual cost of uninstallation later on.

In one embodiment, the system manager prompts a large language model (LLM) to determine a next likely software component and/or item of functionality to be used among a named or unnamed set of software components and/or items of functionality based on a pattern of user activity with respect to software components and/or items of functionality, whether or not that pattern of user activity is frequent or has ever even been observed by the system manager. In one embodiment, the system manager prompts a large language model (LLM) with information gathered about the pattern of user activity to ask the LLM what a user might want to do after performing a set of functionality, after using a set of software components, or a combination thereof. For example, the system manager may prompt the LLM to determine what a user might want to do after using a recruiting software component and an HR software component. The LLM may suggest an employee training software component or a payroll software component based on the pattern. Based on the results, the system manager may provide higher scores for autodeployment to employee training software and/or payroll software that is available among candidate software components. Whether or not named items of functionality or named software components are provided in the pattern covered for a specific prompt, the system manager may provide example items of functionality and/or software components that, while they may not be recommended for the specific prompt, help provide context to the LLM for determining what other items of functionality and/or software components to identify in response to the prompt. The prompt may also include metadata that specifies how the results are to be provided, such as in a comma separated list, in JSON or XML format, etc.

Autodeploying Software Components

Referring to FIG. 2A, user activity logs 210 may include activity information from users 232A, 232B, 232C, and/or 232D, and the activity information is used to train machine learning model(s) 214. If new activity information is received for user 232A, score prediction engine 218 uses machine learning model(s) 214 to predict or update component-specific utility scores 208 for various software components from software component deployment metadata 206. If the autodeployment utility score for a given software component not already deployed to computing environment 230A meets condition(s) specified in the configuration parameters 204, deployment manager 220 determines to trigger deployment of the given software component in computing environment 230A. Deployment engine 228 may manage deployment operations for computing environment 230A to complete deployment.

Following a similar example in FIG. 2B, if new activity information is received for user 232A, agent 234A may coordinate with score prediction engine 218 to use machine learning model(s) 214 to predict or update component-specific utility scores 208 for various software components from software component deployment metadata 206. If the autodeployment utility score for a given software component not already deployed to computing environment 230A meets condition(s) specified in the configuration parameters 204, deployment manager 220 may coordinate with agent 234A to determine to trigger deployment of the given software component in computing environment 230A. Deployment engine 228 may manage deployment operations in coordination with agent 234A to complete deployment in computing environment 230A.

Following a similar example in FIG. 2C, if new activity information is received for user 232A, score prediction engine 218A uses machine learning model(s) 214 to predict or update component-specific utility scores 208 for various software components from software component deployment metadata 206. If the autodeployment utility score for a given software component not already deployed to computing environment environment 230A meets condition(s) specified in the configuration parameters 204, deployment manager 220 determines to trigger deployment of the given software component in computing environment 230A. Deployment engine 228A may manage deployment operations in computing environment 230A to complete deployment.

In various embodiments, one or more software components are automatically deployed by the system manager. As used herein, deploying a software component means downloading the software component, unpacking the software component, installing the software component into an environment, configuring the software component to share physical and/or virtual resources with one or more other software components already installed, configured, and active in the environment, activating the software in the environment, and/or subscribing to a software services agreement to support the software component. Automatic deployment means that the corresponding deployment step is performed without user activity, without requesting user input from before a time at which the system manager automatically determines to perform the deployment step until after a time at which the deployment step is completed. In one example, automatic deployment includes performing all of downloading, unpacking, installing, configuring, activating, and subscribing to the software component without user input. In another example, automatic deployment includes downloading, unpacking, installing, and configuring the software component without user input, and then prompting the user to activate and/or subscribe to the software component as already configured in the target environment. In another example, automatic deployment includes downloading and/or unpacking the software component without user input, and then prompting the user to install the software component as already downloaded and/or unpacked.

In various examples, one or more software components are automatically deployed by the system manager without a user having to select or choose the one or more software components for download and/or installation, without the user having to name or otherwise identify the one or more software components, without a user having to know about the one or more software components or even that the one or more software components exist, without a user having to pick a download or installation location for the one or more software components, without a user having to perform any review or configure of the privacy or security constraints and/or access permissions and/or restrictions for the one or more software components, without a user having to determine whether or not the one or more software components are already installed, without a user having to restart an application or operating system for which the one or more software components operate and/or share resources with, and/or otherwise without a user ever having expressed an explicit interest specific to the one or more software components.

The system manager, or a local agent of the system manager running in the target computing environment, may operate in the background of the target computing environment such that autodeployment decisions do not show up on the display of the target computing environment and/or do not interfere with operation of active software components running in the target computing environment. In one embodiment, the local agent receives an indication from the system manager that autodeployment is triggered for a particular software component, and the local agent begins performing operations that include any combination of downloading the particular software component, unpacking the particular software component, installing the particular software component, activating the particular software component, and/or subscribing to the particular software component in the background of the target computing environment, not visibly to the user and without user involvement. In one example, at the end of the autodeployment process, a notification appears to notify the user that the autodeployment process is complete without requiring any further action from the user to complete the autodeployment process.

Deployment of a software component may be triggered and automated to completion once the predictive model suggests the autodeployment utility score is high enough to satisfy a module deployment threshold or other condition(s) that justify module deployment. The determination on whether or not to autodeploy a software component may be based on settings provided in the autodeployment configuration interface, which is checked and used to determine whether module deployment should be triggered. The system manager can prioritize and queue module installations based on the autodeployment utility score(s) derived from predictive analysis, which promote higher-priority installation of software components with greater probability of use, lower expected cost, and/or higher expected benefit in their relevance to the user's or project's projected tasks or items of functionality to be used.

In one embodiment, autodeploying the software component includes scheduling autodeployment of the software component for a particular time window and, when the particular time window occurs, triggering autodeployment of the software component in the target environment. The schedule may be based on user activity, network traffic or data pipeline low times or non-peak times, and/or based on user preferences specified ahead of time generically with respect to software components in the autodeployment configuration interface.

In various embodiments, downloading the software component may include moving one or more files or objects from a remote location to the target computing environment such that the one or more files or objects, once the software component is installed in the target computing environment, may be used as the software component operates in the target computing environment. In some embodiments, the downloaded files or objects are moved in a compressed or packed format, such as an archive file, and the downloaded files or objects are unpacked or decompressed prior to usage by the software component. Unpacking the archive file may result in distinct files or objects that are referenceable in the target computing environment.

To promote increased security and user control, in one embodiment, downloaded files may be moved directly from the remote location to a sandbox or other secure isolated environment that is designated for storing automatically downloaded software components into the target computing environment. The automatically downloaded software components may also be unpacked or decompressed in the secure isolated environment, and other operations involving installing, activating, and/or subscribing to the software component may occur after receiving user input confirming that the software component should move out of the secure isolated environment into main storage on the device as part of the installation process. The installation process may use the downloaded and/or unpacked version of the software component stored in the secure isolated environment to minimize the real-time deployment cost by eliminating the network bandwidth cost and download time to the device. The preference to use a secure isolated environment may be configured in the autodeployment configuration interface.

In one embodiment, autodeployment of a software component includes identifying a source for a download of the software component that is on a network of the user or that otherwise minimizes or mitigates network resource consumption. For example, the source may be identified on a peer device on a same local network, and the download may be pulled from the peer device rather than from an original remote source. In this manner, as software components trend in autodeployment, the software components may be more readily downloaded for new users based on a wider range of sources that may be closer to the devices of the new users or may otherwise have a higher bandwidth connection available with the devices of the new users.

In various embodiments, installing the software component may include connecting or interleaving resources from the downloaded software component with virtual resources or artifacts, such as storage, processing, network, and/or graphics resources, in a computing environment where the software component is installed. In other words, the artifacts referenced by the downloaded software component may be linked with artifacts available in the target computing environment. Installing the software component may also involve generating an executable form of the software component, where the software component in downloaded form was not executable as-is in the target computing environment. The executable form of the software component may be instantiated natively from the target computing environment, for example, via a single command-line code, a single selectable object having a designated location in the file system, or a single package of executable code referenceable and useable by other software installed in the target computing environment, rather than requiring the selection of an installation file that runs a process (for example, using a base installer in the target environment or an installer built into the installation file) to generate the executable form of the software component to be used as the new reference point from which the software component is run going forward. Generating the executable form of the software component may include referencing a mixture of artifacts native to the target computing environment (e.g., storage resources, database(s), data structure(s), IP address(es), port (s), driver(s), graphics drivers or processors, mouse, keyboard, or touchscreen input driver(s), etc.), and artifacts added to the target computing environment by the installation (e.g., new librar(ies), class(es), driver(s), database(s), data structure(s), background process(es), etc.). Automatically installing the software component may include applying, to the target computing environment, the default location and configuration settings recommended for the software component, and/or making adjustments to the default location and/or configuration settings based on preferences specified ahead-of-time in user preferences provided generically with respect to different candidate software components. In various embodiments, after automatic installation is completed, the software component may newly appear as an interface item in a menu, toolbar, among buttons, in a directory that shows or otherwise includes installed software components, and/or in another location or interface space that includes installed software components, where uninstalled software components do not appear in the location or interface space.

The autodeployed software component, when used, may operate to perform functionality using newly available libraries of source code and/or machine code, executables, or other stored software that was not available on the target system before the software component was autodeployed.

In one embodiment, the autodeployed but not yet installed software component may appear as an interface item in a menu, toolbar, among buttons, in a director, or in another location or interface space that is not reserved exclusively for installed software components. The autodeployed software component may, for example, have been downloaded and/or unpacked but not yet installed, and the user may be prompted, via the interface item or upon clicking on the interface item, to complete installation of the software component. In this manner, the user may see and obtain benefit from software components for which some but not all autodeployment steps have occurred. The interface item may be populated after some autodeployment steps have been completed, and the interface space may be designated for those interface items for which some or all deployment steps have been completed, whether autodeployed or not. This reduces the interface footprint to those items for which a high probability of use are predicted, and for which some preparation (such as download and/or installation) has been done to reduce the cost of using the software component when first used in the target computing environment.

In one embodiment, once the software component is autodeployed, a notification may be displayed or sent to the user of the target environment to indicate that the software component has been autodeployed. Such a notification may include details about why the software component was autodeployed, including, for example, a specific usage pattern detected, functionality offered by the software component, frequent inputs and/or outputs of the software component, patterns of software component usage that commonly include the software component, links to tutorials and/or demos of the software component, pricing information for subscriptions related to the autodeployed software component, how much space is being consumed by the autodeployed software component, how much free space is left generally in the target environment or left specifically for autodeployed software components, an option to remove the software component from the target environment, an option to whitelist or blacklist specific software components or types of software components or adjust any other configuration settings for autodeploying software components, and any other information that may be helpful to the user to determine whether to explore or remove the software component.

In one embodiment, the machine learning model receives positive feedback from users based on initial usage of autodeployed software components, higher positive feedback from extended or repeated usage of autodeployed software components, negative feedback from non-usage of autodeployed software components, which may be more negative over a longer period of time after autodeployment, and even more negative feedback from uninstallation and/or full removal of autodeployed software components. Such feedback may be user-specific and/or applied to a full group of users. For example, even if a software component would be recommended for autodeployment in a similar scenario for a large group of users, past negative feedback from a particular user may indicate that the software component should not be autodeployed for that particular user. In the example, the particular user may have already recently chosen to uninstall or remove the software component, whether or not the software component was autodeployed, and that action may be taken as strongly negative feedback that the software component should not be re-installed for the particular user.

In one embodiment, a user may provide direct feedback by responding to a notification about an autodeployment of a particular software component. For example, the user is notified that the particular software component has been autodeployed, and the notification contains an option to rate the autodeployment as positive (e.g., thumbs up or high rating on a rating scale) or negative (e.g., thumbs down or low rating on a rating scale). The user may rate an autodeployment as positive even if the user does not use autodeployed software component and even if the user removes the autodeployed software component, to signal to the system manager that the user would like autodeployment of similar software components (e.g., such as other components that are associated with similar items of functionality) in the future even if the particular autodeployed software component was not used.

Any feedback data collected can be used to tune or retrain the model(s) used to determine whether to autodeploy the software component, such as the model(s) used to determine the autodeployment utility score, with negative feedback leading to lower scores in similar scenarios and positive feedback leading to higher scores in similar scenarios.

Computer System Architecture

Figure 3:
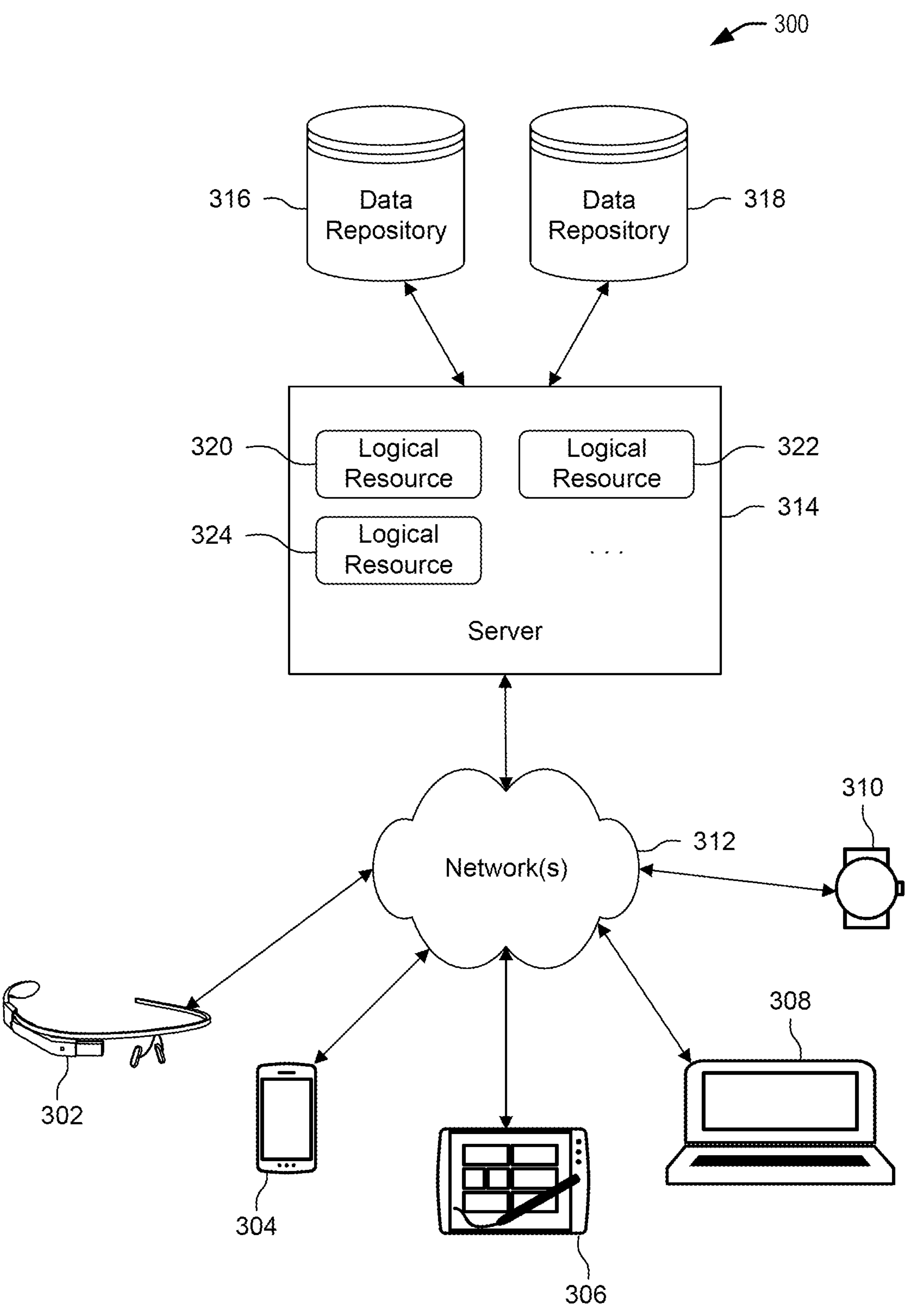
FIG. 3 depicts a simplified diagram of a distributed system for implementing certain aspects.

FIG. 3 depicts a simplified diagram of a distributed system 300 for implementing an embodiment. In the illustrated embodiment, distributed system 300 includes one or more client computing devices 302, 304, 306, 308, and/or 310 coupled to a server 314 via one or more communication networks 312. Clients computing devices 302, 304, 306, 308, and/or 310 may be configured to execute one or more applications.

In various aspects, server 314 may be adapted to run one or more services or software applications that enable techniques for autodeploying software components.

In certain aspects, server 314 may also provide other services or software applications that can include non-virtual and virtual environments. In some aspects, these services may be offered as web-based or cloud services, such as under a Software as a Service (SaaS) model to the users of client computing devices 302, 304, 306, 308, and/or 310. Users operating client computing devices 302, 304, 306, 308, and/or 310 may in turn utilize one or more client applications to interact with server 314 to utilize the services provided by these components.

In the configuration depicted in FIG. 3, server 314 may include one or more components 320, 322 and 324 that implement the functions performed by server 314. These components may include software components that may be executed by one or more processors, hardware components, or combinations thereof. It should be appreciated that various different system configurations are possible, which may be different from distributed system 300. The embodiment shown in FIG. 3 is thus one example of a distributed system for implementing an embodiment system and is not intended to be limiting.

Users may use client computing devices 302, 304, 306, 308, and/or 310 for techniques for autodeploying software components in accordance with the teachings of this disclosure. A client device may provide an interface that enables a user of the client device to interact with the client device. The client device may also output information to the user via this interface. Although FIG. 3 depicts only five client computing devices, any number of client computing devices may be supported.

The client devices may include various types of computing systems such as smart phones or other portable handheld devices, general purpose computers such as personal computers and laptops, workstation computers, smart watches, smart glasses, or other wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, Apple Watch®, Meta Quest®, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 312 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 312 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 314 may be composed of one or more general purpose computers, specialized server computers (including, by way of example, PC (personal computer) servers, UNIX® servers, mid-range servers, mainframe computers, rack-mounted servers, etc.), server farms, server clusters, a Real Application Cluster (RAC), database servers, or any other appropriate arrangement and/or combination. Server 314 can include one or more virtual machines running virtual operating systems, or other computing architectures involving virtualization such as one or more flexible pools of logical storage devices that can be virtualized to maintain virtual storage devices for the server. In various aspects, server 314 may be adapted to run one or more services or software applications that provide the functionality described in the foregoing disclosure.

The computing systems in server 314 may run one or more operating systems including any of those discussed above, as well as any commercially available server operating system. Server 314 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 314 may include one or more applications to analyze and consolidate data feeds and/or event updates received from users of client computing devices 302, 304, 306, 308, and/or 310. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 314 may also include one or more applications to display the data feeds and/or real-time events via one or more display devices of client computing devices 302, 304, 306, 308, and/or 310.

Distributed system 300 may also include one or more data repositories 316, 318. These data repositories may be used to store data and other information in certain aspects. For example, one or more of the data repositories 316, 318 may be used to store information for techniques for autodeploying software components. Data repositories 316, 318 may reside in a variety of locations. For example, a data repository used by server 314 may be local to server 314 or may be remote from server 314 and in communication with server 314 via a network-based or dedicated connection. Data repositories 316, 318 may be of different types. In certain aspects, a data repository used by server 314 may be a database, for example, a relational database, a container database, an Exadata storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 316, 318 may also be used by applications to store application data. The data repositories used by applications may be of different types such as, for example, a key-value store repository, an object store repository, or a general storage repository supported by a file system.

In one embodiment, server 314 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 4:
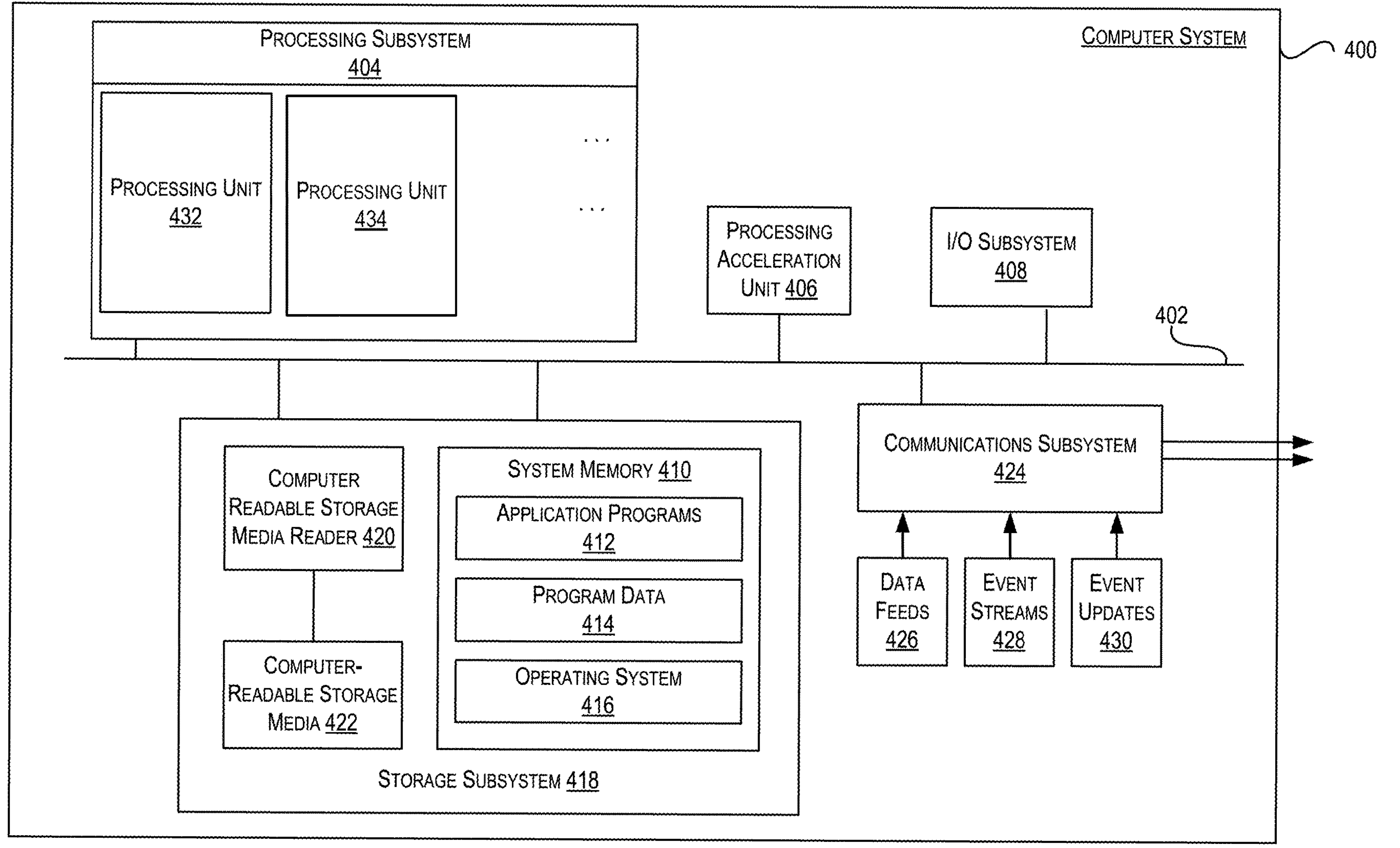
FIG. 4 illustrates an example computer system that may be used to implement certain aspects.

FIG. 4 illustrates an exemplary computer system 400 that may be used to implement certain aspects. For example, in some aspects, computer system 400 may be used to implement any of the system 100 for enriching log records with fields from other log records in structured format as shown in FIG. 1 and various servers and computer systems described above. As shown in FIG. 4, computer system 400 includes various subsystems including a processing subsystem 404 that communicates with a number of other subsystems via a bus subsystem 402. These other subsystems may include a processing acceleration unit 406, an I/O subsystem 408, a storage subsystem 418, and a communications subsystem 424. Storage subsystem 418 may include non-transitory computer-readable storage media including storage media 422 and a system memory 410.

Bus subsystem 402 provides a mechanism for letting the various components and subsystems of computer system 400 communicate with each other as intended. Although bus subsystem 402 is shown schematically as a single bus, alternative aspects of the bus subsystem may utilize multiple buses. Bus subsystem 402 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 404 controls the operation of computer system 400 and may comprise one or more processors, application specific integrated circuits (ASICs), or field programmable gate arrays (FPGAs). The processors may include be single core or multicore processors. The processing resources of computer system 400 can be organized into one or more processing units 432, 434, etc. A processing unit may include one or more processors, one or more cores from the same or different processors, a combination of cores and processors, or other combinations of cores and processors. In some aspects, processing subsystem 404 can include one or more special purpose co-processors such as graphics processors, digital signal processors (DSPs), or the like. In some aspects, some or all of the processing units of processing subsystem 404 can be implemented using customized circuits, such as application specific integrated circuits (ASICs), or field programmable gate arrays (FPGAs).

In some aspects, the processing units in processing subsystem 404 can execute instructions stored in system memory 410 or on computer readable storage media 422. In various aspects, the processing units can execute a variety of programs or code instructions and can maintain multiple concurrently executing programs or processes. At any given time, some or all of the program code to be executed can be resident in system memory 410 and/or on computer-readable storage media 422 including potentially on one or more storage devices. Through suitable programming, processing subsystem 404 can provide various functionalities described above. In instances where computer system 400 is executing one or more virtual machines, one or more processing units may be allocated to each virtual machine.

In certain aspects, a processing acceleration unit 406 may optionally be provided for performing customized processing or for off-loading some of the processing performed by processing subsystem 404 so as to accelerate the overall processing performed by computer system 400.

I/O subsystem 408 may include devices and mechanisms for inputting information to computer system 400 and/or for outputting information from or via computer system 400. In general, use of the term input device is intended to include all possible types of devices and mechanisms for inputting information to computer system 400. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 400 to a user or other computer. User interface output devices may include a display subsystem, indicator lights, or non-visual displays such as audio output devices, etc. The display subsystem may be a cathode ray tube (CRT), a flat-panel device, such as that using a light emitting diode (LED) display, a liquid crystal display (LCD) or plasma display, a projection device, a touch screen, a computer monitor and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 418 provides a repository or data store for storing information and data that is used by computer system 400. Storage subsystem 418 provides a tangible non-transitory computer-readable storage medium for storing the basic programming and data constructs that provide the functionality of some aspects. Storage subsystem 418 may store software (e.g., programs, code modules, instructions) that when executed by processing subsystem 404 provides the functionality described above. The software may be executed by one or more processing units of processing subsystem 404. Storage subsystem 418 may also provide a repository for storing data used in accordance with the teachings of this disclosure.

Storage subsystem 418 may include one or more non-transitory memory devices, including volatile and non-volatile memory devices. As shown in FIG. 4, storage subsystem 418 includes a system memory 410 and a computer-readable storage media 422. System memory 410 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 400, such as during start-up, may typically be stored in the ROM. The RAM typically contains data and/or program components that are presently being operated and executed by processing subsystem 404. In some implementations, system memory 410 may include multiple different types of memory, such as static random access memory (SRAM), dynamic random access memory (DRAM), and the like.

By way of example, and not limitation, as depicted in FIG. 4, system memory 410 may load application programs 412 that are being executed, which may include various applications such as Web browsers, mid-tier applications, relational database management systems (RDBMS), etc., program data 414, and an operating system 416. By way of example, operating system 416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 422 may store programming and data constructs that provide the functionality of some aspects. Computer-readable media 422 may provide storage of computer-readable instructions, data structures, program components, and other data for computer system 400. Software (programs, code modules, instructions) that, when executed by processing subsystem 404 provides the functionality described above, may be stored in storage subsystem 418. By way of example, computer-readable storage media 422 may include non-volatile memory such as a hard disk drive, a magnetic disk drive, an optical disk drive such as a CD ROM, digital video disc (DVD), a Blu-Ray® disk, or other optical media. Computer-readable storage media 422 may include, but is not limited to, Zip® drives, flash memory cards, universal serial bus (USB) flash drives, secure digital (SD) cards, DVD disks, digital video tape, and the like. Computer-readable storage media 422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 418 may also include a computer-readable storage media reader 420 that can further be connected to computer-readable storage media 422. Reader 420 may receive and be configured to read data from a memory device such as a disk, a flash drive, etc.

In certain aspects, computer system 400 may support virtualization technologies, including but not limited to virtualization of processing and memory resources. For example, computer system 400 may provide support for executing one or more virtual machines. In certain aspects, computer system 400 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 400. Accordingly, multiple operating systems may potentially be run concurrently by computer system 400.

Communications subsystem 424 provides an interface to other computer systems and networks. Communications subsystem 424 serves as an interface for receiving data from and transmitting data to other systems from computer system 400. For example, communications subsystem 424 may enable computer system 400 to establish a communication channel to one or more client devices via the Internet for receiving and sending information from and to the client devices. For example, the communication subsystem may be used to transmit a response to a user regarding the inquiry for a Chabot.

Communication subsystem 424 may support both wired and/or wireless communication protocols. For example, in certain aspects, communications subsystem 424 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 424 can provide wired network connectivity (e.g., Ethernet) in addition to or instead of a wireless interface.

Communication subsystem 424 can receive and transmit data in various forms. For example, in some aspects, in addition to other forms, communications subsystem 424 may receive input communications in the form of structured and/or unstructured data feeds 426, event streams 428, event updates 430, and the like. For example, communications subsystem 424 may be configured to receive (or send) data feeds 426 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 424 may be configured to receive data in the form of continuous data streams, which may include event streams 428 of real-time events and/or event updates 430, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 424 may also be configured to communicate data from computer system 400 to other computer systems or networks. The data may be communicated in various different forms such as structured and/or unstructured data feeds 426, event streams 428, event updates 430, and the like to one or more databases that may be in communication with one or more streaming data source computers coupled to computer system 400.

Computer system 400 can be one of various types, including a handheld portable device (e.g., an iPhone® cellular phone, an iPad® computing tablet, a personal digital assistant (PDA)), a wearable device (e.g., a Google Glass® head mounted display), a personal computer, a workstation, a mainframe, a kiosk, a server rack, or any other data processing system. Due to the ever-changing nature of computers and networks, the description of computer system 400 depicted in FIG. 4 is intended only as a specific example. Many other configurations having more or fewer components than the system depicted in FIG. 4 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:

receiving, for one or more first software users, one or more parameters of one or more first conditions of a software component autodeployment setting, wherein the software component autodeployment setting at least partially controls whether to automatically deploy any candidate software components to one or more computing environments of the one or more first software users, wherein the software component autodeployment setting for the one or more first software users is different than another software component autodeployment setting available for the one or more first software users; wherein the other software component autodeployment setting comprises one or more other parameters for the one or more first conditions; wherein at least one of the one or more first conditions is not specific to any candidate software component;

storing candidate software component deployment metadata identifying a plurality of software components available for deployment in a particular computing environment of a particular software user of the one or more first software users; wherein the plurality of software components available for deployment comprise a particular software component and one or more other software components; wherein the particular computing environment of the particular software user does not include the particular software component and does not include the one or more other software components;

receiving one or more particular logs of user activity in the particular computing environment by the particular software user;

analyzing the one or more particular logs of user activity of the particular software user using a machine learning model trained on a plurality of logs of user activity of a plurality of software users to determine:

a particular autodeployment utility score comprising a predicted degree of utility of the particular software component, if deployed, for the particular software user, and one or more other autodeployment utility scores comprising one or more other predicted degrees of utility of the one or more other software components, if deployed, for the particular software user;

based at least in part on determining that the one or more first conditions of the software component autodeployment setting are satisfied, and based at least in part on the particular autodeployment utility score and the one or more other autodeployment utility scores, selecting, from the plurality of software components, the particular software component for deployment based on a comparison of the particular autodeployment utility score to the one or more other autodeployment utility scores, and automatically performing one or more deployment operations for the particular software component in the particular computing environment of the particular software user while refraining from automatically performing deployment operations for the one or more other software components to avoid deployment of lower-utility software components in the particular computing environment;

wherein the one or more first conditions would not be satisfied based on the one or more other parameters.

2. The computer-implemented method of claim 1, wherein automatically performing one or more deployment operations for the particular software component in the particular computing environment comprises:

downloading the particular software component to the particular computing environment;

after said downloading is complete, automatically installing the particular software component in the particular computing environment; wherein said automatically installing generates an executable version of the particular software component that references one or more particular resources of the particular computing environment;

wherein, prior to said automatically installing:

the particular software component was not installed in the particular computing environment, and the particular software component did not reference the one or more particular resources of the particular computing environment.

3. The computer-implemented method of claim 1, wherein automatically performing one or more deployment operations for the particular software component in the particular computing environment comprises:

downloading the particular software component to the particular computing environment; and after said downloading is complete, notifying the particular software user that said downloading is complete;

wherein the particular software component did not exist in the particular computing environment prior said downloading; and wherein installation of the particular software component is not automatically triggered after said downloading.

4. The computer-implemented method of claim 1, wherein the plurality of logs of user activity of the plurality of software users indicate a pattern that the particular software component is used after a gap of time after one or more other software user activities having one or more characteristics, and wherein analyzing the one or more particular logs of user activity comprises comparing one or more particular characteristics of the user activity of the one or more particular logs with the one or more characteristics and determining that an amount of time has passed relative to the gap of time, and wherein the particular autodeployment utility score accounts for:

a similarity between the one or more particular characteristics and the one or more characteristics, and the amount of time relative to the gap of time.

5. The computer-implemented method of claim 1, wherein the particular software component is a first particular software component, wherein the plurality of logs of user activity of the plurality of software users indicate a cluster of software components that are used by same software users, wherein the cluster of software components comprise the first particular software component and a second particular software component, wherein the second particular software component is indicated to be in use by the one or more particular logs of user activity, and wherein the particular autodeployment utility score accounts for the second particular software component that is indicated to be in use.

6. The computer-implemented method of claim 1, wherein analyzing the one or more particular logs of user activity of the particular software user using the machine learning model trained on the plurality of logs of user activity of the plurality of software users to determine the particular autodeployment utility score comprises:

determining a predicted cost, in terms of one or more computing resources, of performing the one or more deployment operations for the particular software component, determining a predicted benefit of having the one or more deployment operations performed automatically ahead of time rather than manually upon request, and determining a predicted likelihood that the particular software component will be used by the particular software user;

wherein the particular autodeployment utility score is based at least in part on the predicted cost, the predicted benefit, and the predicted likelihood that the particular software component will be used.

7. The computer-implemented method of claim 1, wherein the one or more parameters of the one or more conditions indicate one or more weights of one or more utility characteristics for the software component autodeployment setting, and wherein analyzing the one or more particular logs of user activity of the particular software user using the machine learning model trained on the plurality of logs of user activity of the plurality of software users to determine the particular autodeployment utility score comprises:

determining a plurality of values for a plurality of utility characteristics for implementing the particular software component in the particular computing environment for the particular software user;

generating one or more weighted utility values by weighting one or more of the plurality of values corresponding to the one or more utility characteristics according to the one or more weights;

wherein the particular autodeployment utility score is based at least in part on the one or more weighted utility values.

8. The computer-implemented method of claim 1, further comprising:

after automatically performing the one or more deployment operations for the particular software component, receiving feedback from the particular software user about the particular software component;

updating the machine learning model based at least in part on the feedback; and analyzing logs of user activity of software users to determine autodeployment utility scores using the machine learning model as updated.

9. The computer-implemented method of claim 1, further comprising:

determining that automatically performing the one or more deployment operations for the particular software component would use an amount of resources;

determining that the amount of resources for the particular software component is not available in the particular computing environment;

determining a second particular autodeployment utility score for a second particular software component for which deployment has already been performed in the particular computing environment;

based at least in part on the second particular autodeployment utility score and based at least in part on determining that the amount of resources for the particular software component are not available in the particular computing environment, automatically removing the second particular software component from the particular computing environment before automatically performing the one or more deployment operations for the particular software component.

10. The computer-implemented method of claim 1, wherein the machine learning model is a first machine learning model that accounts for at least one different utility characteristic than a second machine learning model, the method further comprising:

analyzing the one or more particular logs of user activity of the particular software user using the second machine learning model trained on a plurality of logs of user activity of a plurality of software users to determine:

a second particular autodeployment utility score comprising a second predicted degree of utility of the particular software component, if deployed, for the particular software user, and one or more other second autodeployment utility scores comprising one or more other second predicted degrees of utility of the one or more other software components, if deployed, for the particular software user;

wherein the second predicted degree of utility is different than the predicted degree of utility; and wherein said automatically performing the one or more deployment operations is further based at least in part on the second predicted degree of utility.

11. A computer-program product comprising one or more non-transitory machine-readable storage media, including stored instructions configured to cause a computing system to perform a set of actions including:

receiving, for one or more first software users, one or more parameters of one or more first conditions of a software component autodeployment setting, wherein the software component autodeployment setting at least partially controls whether to automatically deploy any candidate software components to one or more computing environments of the one or more first software users, wherein the software component autodeployment setting for the one or more first software users is different than another software component autodeployment setting available for the one or more first software users; wherein the other software component autodeployment setting comprises one or more other parameters for the one or more first conditions; wherein at least one of the one or more first conditions is not specific to any candidate software component;

storing candidate software component deployment metadata identifying a plurality of software components available for deployment in a particular computing environment of a particular software user of the one or more first software users; wherein the plurality of software components available for deployment comprise a particular software component and one or more other software components; wherein the particular computing environment of the particular software user does not include the particular software component and does not include the one or more other software components;

receiving one or more particular logs of user activity in the particular computing environment by the particular software user;

analyzing the one or more particular logs of user activity of the particular software user using a machine learning model trained on a plurality of logs of user activity of a plurality of software users to determine:

a particular autodeployment utility score comprising a predicted degree of utility of the particular software component, if deployed, for the particular software user, and one or more other autodeployment utility scores comprising one or more other predicted degrees of utility of the one or more other software components, if deployed, for the particular software user;

based at least in part on determining that the one or more first conditions of the software component autodeployment setting are satisfied, and based at least in part on the particular autodeployment utility score and the one or more other autodeployment utility scores, selecting, from the plurality of software components, the particular software component for deployment based on a comparison of the particular autodeployment utility score to the one or more other autodeployment utility scores, and automatically performing one or more deployment operations for the particular software component in the particular computing environment of the particular software user while refraining from automatically performing deployment operations for the one or more other software components to avoid deployment of lower-utility software components in the particular computing environment;

wherein the one or more first conditions would not be satisfied based on the one or more other parameters.

12. The computer-program product of claim 11, wherein automatically performing one or more deployment operations for the particular software component in the particular computing environment comprises:

downloading the particular software component to the particular computing environment;

after said downloading is complete, automatically installing the particular software component in the particular computing environment; wherein said automatically installing generates an executable version of the particular software component that references one or more particular resources of the particular computing environment;

wherein, prior to said automatically installing:

the particular software component was not installed in the particular computing environment, and the particular software component did not reference the one or more particular resources of the particular computing environment.

13. The computer-program product of claim 11, wherein automatically performing one or more deployment operations for the particular software component in the particular computing environment comprises:

downloading the particular software component to the particular computing environment; and after said downloading is complete, notifying the particular software user that said downloading is complete;

wherein the particular software component did not exist in the particular computing environment prior said downloading; and wherein installation of the particular software component is not automatically triggered after said downloading.

14. The computer-program product of claim 11, wherein analyzing the one or more particular logs of user activity of the particular software user using the machine learning model trained on the plurality of logs of user activity of the plurality of software users to determine the particular autodeployment utility score comprises:

determining a predicted cost, in terms of one or more computing resources, of performing the one or more deployment operations for the particular software component, determining a predicted benefit of having the one or more deployment operations performed automatically ahead of time rather than manually upon request, and determining a predicted likelihood that the particular software component will be used by the particular software user;

wherein the particular autodeployment utility score is based at least in part on the predicted cost, the predicted benefit, and the predicted likelihood that the particular software component will be used.

15. The computer-program product of claim 11, wherein the set of actions further includes:

determining that automatically performing the one or more deployment operations for the particular software component would use an amount of resources;

determining that the amount of resources for the particular software component is not available in the particular computing environment;

determining a second particular autodeployment utility score for a second particular software component for which deployment has already been performed in the particular computing environment;

based at least in part on the second particular autodeployment utility score and based at least in part on determining that the amount of resources for the particular software component are not available in the particular computing environment, automatically removing the second particular software component from the particular computing environment before automatically performing the one or more deployment operations for the particular software component.

16. A system comprising:

one or more processors;

one or more non-transitory computer-readable media storing instructions, which, when executed by the system, cause the system to perform a set of actions including:

receiving, for one or more first software users, one or more parameters of one or more first conditions of a software component autodeployment setting, wherein the software component autodeployment setting at least partially controls whether to automatically deploy any candidate software components to one or more computing environments of the one or more first software users, wherein the software component autodeployment setting for the one or more first software users is different than another software component autodeployment setting available for the one or more first software users; wherein the other software component autodeployment setting comprises one or more other parameters for the one or more first conditions; wherein at least one of the one or more first conditions is not specific to any candidate software component;

storing candidate software component deployment metadata identifying a plurality of software components available for deployment in a particular computing environment of a particular software user of the one or more first software users; wherein the plurality of software components available for deployment comprise a particular software component and one or more other software components; wherein the particular computing environment of the particular software user does not include the particular software component and does not include the one or more other software components;

receiving one or more particular logs of user activity in the particular computing environment by the particular software user;

analyzing the one or more particular logs of user activity of the particular software user using a machine learning model trained on a plurality of logs of user activity of a plurality of software users to determine:

a particular autodeployment utility score comprising a predicted degree of utility of the particular software component, if deployed, for the particular software user, and one or more other autodeployment utility scores comprising one or more other predicted degrees of utility of the one or more other software components, if deployed, for the particular software user;

based at least in part on determining that the one or more first conditions of the software component autodeployment setting are satisfied, and based at least in part on the particular autodeployment utility score and the one or more other autodeployment utility scores, selecting, from the plurality of software components, the particular software component for deployment based on a comparison of the particular autodeployment utility score to the one or more other autodeployment utility scores, and automatically performing one or more deployment operations for the particular software component in the particular computing environment of the particular software user while refraining from automatically performing deployment operations for the one or more other software components to avoid deployment of lower-utility software components in the particular computing environment;

wherein the one or more first conditions would not be satisfied based on the one or more other parameters.

17. The system of claim 16, wherein automatically performing one or more deployment operations for the particular software component in the particular computing environment comprises:

downloading the particular software component to the particular computing environment;

after said downloading is complete, automatically installing the particular software component in the particular computing environment; wherein said automatically installing generates an executable version of the particular software component that references one or more particular resources of the particular computing environment;

wherein, prior to said automatically installing:

the particular software component was not installed in the particular computing environment, and the particular software component did not reference the one or more particular resources of the particular computing environment.

18. The system of claim 16, wherein automatically performing one or more deployment operations for the particular software component in the particular computing environment comprises:

downloading the particular software component to the particular computing environment; and after said downloading is complete, notifying the particular software user that said downloading is complete;

wherein the particular software component did not exist in the particular computing environment prior said downloading; and wherein installation of the particular software component is not automatically triggered after said downloading.

19. The system of claim 16, wherein analyzing the one or more particular logs of user activity of the particular software user using the machine learning model trained on the plurality of logs of user activity of the plurality of software users to determine the particular autodeployment utility score comprises:

determining a predicted cost, in terms of one or more computing resources, of performing the one or more deployment operations for the particular software component, determining a predicted benefit of having the one or more deployment operations performed automatically ahead of time rather than manually upon request, and determining a predicted likelihood that the particular software component will be used by the particular software user;

wherein the particular autodeployment utility score is based at least in part on the predicted cost, the predicted benefit, and the predicted likelihood that the particular software component will be used.

20. The system of claim 16, wherein the set of actions further includes:

determining that automatically performing the one or more deployment operations for the particular software component would use an amount of resources;

determining that the amount of resources for the particular software component is not available in the particular computing environment;

determining a second particular autodeployment utility score for a second particular software component for which deployment has already been performed in the particular computing environment;

based at least in part on the second particular autodeployment utility score and based at least in part on determining that the amount of resources for the particular software component are not available in the particular computing environment, automatically removing the second particular software component from the particular computing environment before automatically performing the one or more deployment operations for the particular software component.

* * * * *